United States Patent
Nakamura et al.

(10) Patent No.: US 7,058,761 B2
(45) Date of Patent: Jun. 6, 2006

(54) CLUSTERING DISK CONTROLLER, ITS DISK CONTROL UNIT AND LOAD BALANCING METHOD OF THE UNIT

(75) Inventors: Shuji Nakamura, Odawara (JP); Kazuhisa Fujimoto, Kokubunji (JP); Hiroki Kanai, Higashiyamato (JP); Akira Yoshida, Hatano (JP)

(73) Assignee: Hitachi, Ltd., Tokyo (JP)

( * ) Notice: Subject to any disclaimer, the term of this patent is extended or adjusted under 35 U.S.C. 154(b) by 566 days.

(21) Appl. No.: 10/090,767

(22) Filed: Mar. 6, 2002

(65) Prior Publication Data
US 2003/0131192 A1   Jul. 10, 2003

(30) Foreign Application Priority Data
Jan. 10, 2002   (JP) ............................. 2002-002936

(51) Int. Cl.
*G06F 15/16* (2006.01)
(52) U.S. Cl. ........................... 711/114; 707/100; 710/1; 710/21
(58) Field of Classification Search ................ 707/100; 709/100, 105, 243, 244; 710/1, 21; 711/114
See application file for complete search history.

(56) References Cited

U.S. PATENT DOCUMENTS 5,680,539 A * 10/1997 Jones ............................. 714/6
6,374,336 B1 * 4/2002 Peters et al. ................. 711/167
6,804,245 B1 * 10/2004 Mitchem et al. ....... 370/395.31

* cited by examiner

*Primary Examiner*—Ario Etienne
*Assistant Examiner*—Emmanuel Coffy
(74) *Attorney, Agent, or Firm*—Reed Smith LLP; Stanley P. Fisher, Esq.; Juan Carlos A. Marquez, Esq.

(57) ABSTRACT

A clustering disk subsystem comprising a switch holding a table which can modify a destination of a request from a host computer, wherein the switch transfers an access request to another channel according to a destination channel status such as heavy load or fault, and the channel which received the request processes the request by proxy for load balancing between internal disk controllers in a clustering disk subsystem. The subsystem has an effect in which load balancing or fail-over between channels or disk controllers can be performed without any special hardware or software in the host. As a result, good performance can be obtained even when access requests from the host computer are concentrated in a specific channel or disk controller.

10 Claims, 26 Drawing Sheets

CLUSTERING DISK CONTROLLER, ITS DISK CONTROL UNIT AND LOAD BALANCING METHOD OF THE UNIT

BACKGROUND OF THE INVENTION

1. Field of the Invention

This invention relates to a clustering disk controller and its load balancing method, and in particular to a disk subsystem which stores data in plural magnetic disk units.

2. Description of the Related Prior Art

There is a disk control unit (hereafter, DKC) which performs storage and read-out of data to plural magnetic disk units (hereafter, drives), the drive and DKC together being referred to as a disk subsystem.

One of the requisites of a disk subsystem is enhancement of storage capacity and curtailment of management costs. As there is a limit to the capacity of the drives which can be managed by one DKC, plural disk subsystems are provided to increase the storage capacity. However, the management cost likewise increases. Attention has therefore been focused on a storage area network (hereafter, SAN) which achieves centralization of disk subsystems that were previously connected to each server and therefore dispersed. An example of a type of disk subsystem in a SAN environment is shown in FIG. 2. Plural disk subsystems 1 are connected to a host computer 0 via a SAN switch 39. One disk subsystem comprises only one disk controller 10 (abbreviated to DKC 10 hereinafter), and is connected with the SAN switch 39 via a channel 2. A logical disk 7 is a storage region recognized by a host computer 0. The host computer 0 looks up data in a specific address of the logical disk 7 via the SAN switch 39 and channel 2, and issues update requests. The channel 2 maybe a fiber channel or SCSI, etc. Plural disk control units 10 and drives 17 are connected by a drive IF 16. The drive IF 16 may be a fiber channel or SCSI, etc. A DKC 10 broadly comprises a channel control unit 11 which controls the channels, a disk control unit 14 which controls the drives, a shared memory unit part 12 which stores control information 3 of the DKC, a cache memory unit 13 holding cache data 5, and a connection 15 which connects these component units together. The connection 15 is a bus or an interconnection, etc. The DKC 10 looks up data and performs update processes according to commands from the host computer 0.

However, in a SAN environment, if the host computer does not know in which disk subsystem the data can be accessed, it cannot access the data. Therefore, there is a problem in that the user has to manage the whereabouts of the data. JP-A-2000-99281 discloses an enlarged disk subsystem wherein plural disk subsystems, which conventionally each comprised one DKC, are clustered together without passing via the SAN switch to increase storage capacity and connection channels. The clustering disk subsystem can be managed as one disk subsystem, and therefore can cut down on management costs.

An example of the structure of a clustering disk subsystem is shown in FIG. 3. In the disk subsystem of FIG. 3, mutual data access between plural DKC 10 is made possible by providing a disk controller connecting means 20. This permits sharing of the data between plural disk control units.

SUMMARY OF THE INVENTION

In the clustering disk subsystem of the prior art clustering as shown in FIG. 3, when a deviation arises in the load between the internal DKC, the load cannot be distributed, and equivalent performance cannot be extracted between the internal DKC. If access requests from the host computer are directed to a specific DKC, even if the operating rate of other DKC is low, the DKC specified by the host computer performs the processing, and as processing is performed only by the specified DKC, an imbalance arises in the load.

Moreover, when a channel control unit develops a fault, the channels connected to the channel control unit can no longer be used. This is due to the fact that the disk control units are accessed only via the channel specified by the host computer.

Hence, a channel-DKC switch is provided in the clustering disk subsystem, a distribution table is provided holding information regarding the channel control unit to which access requests from the host computer are to be forwarded by the channel-DKC switch, and requests are forwarded based on this distribution table.

Further, a service processor (SVP) which manages unit information is provided which rewrites the distribution table, and the channel-DKC switch can therefore forward access requests from the host computer to a suitable channel control unit based on the unit load or fault status.

Other and further objects, features and advantages of the invention will appear more fully from the following description.

BRIEF DESCRIPTION OF THE SEVERAL VIEWS OF DRAWINGS

A preferred form of the present invention is illustrated in the accompanying drawings in which.

DETAILED DESCRIPTION OF THE INVENTION

Figure 1:
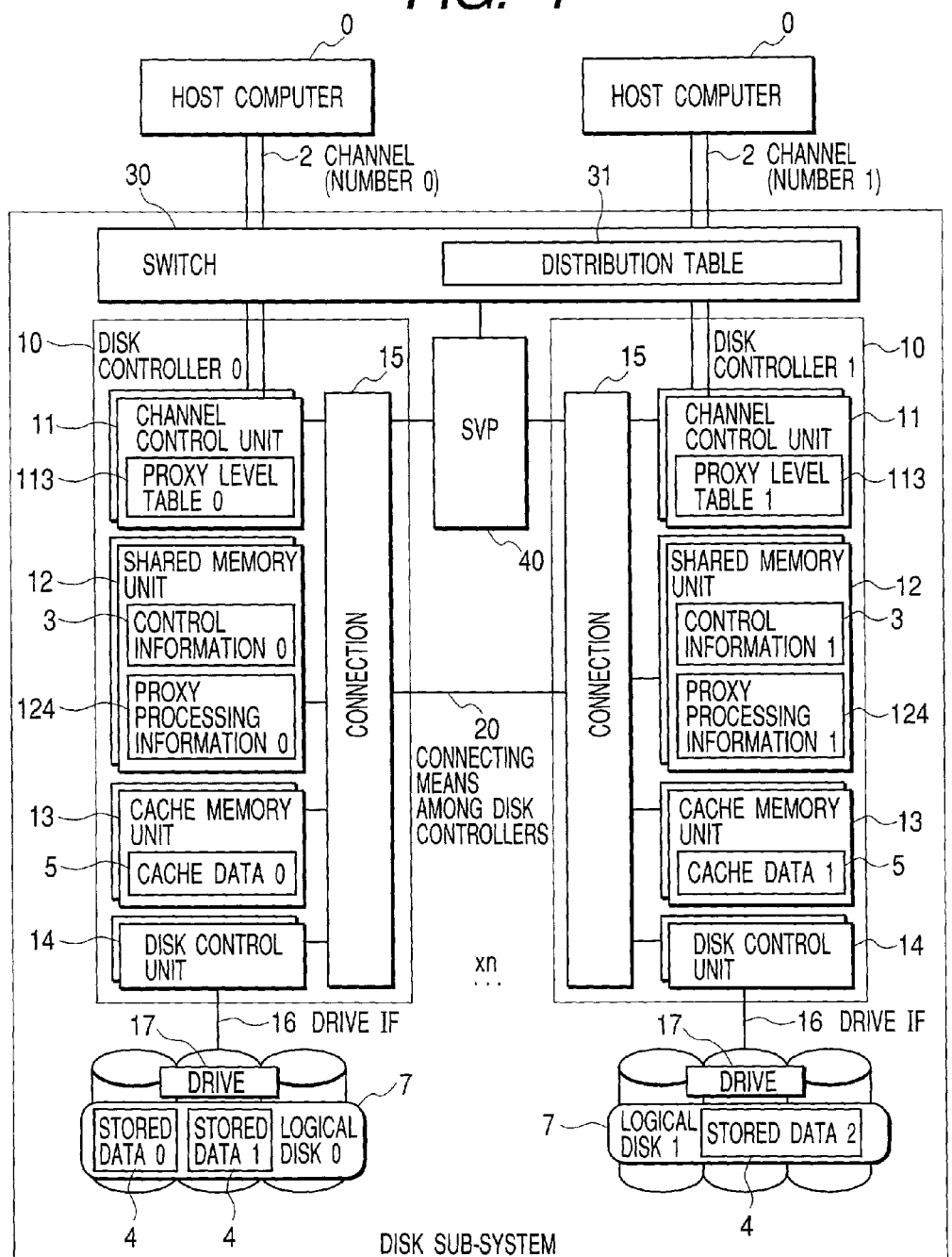
FIG. 1 is an example of a block diagram showing an outline of a disk control unit according to this invention.
Figure 2:
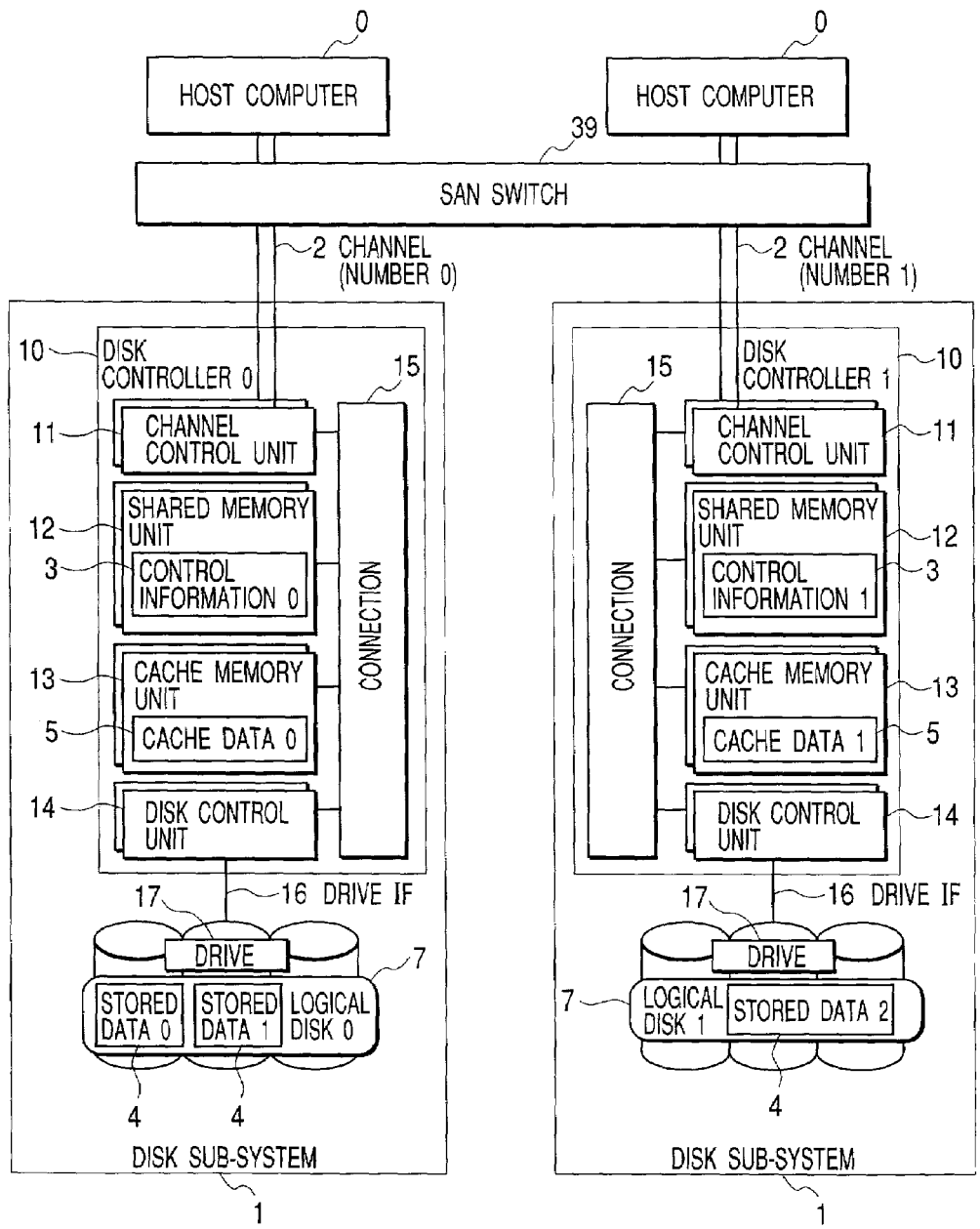
FIG. 2 is an example of a block diagram showing an outline of a conventional disk control unit.
Figure 3:
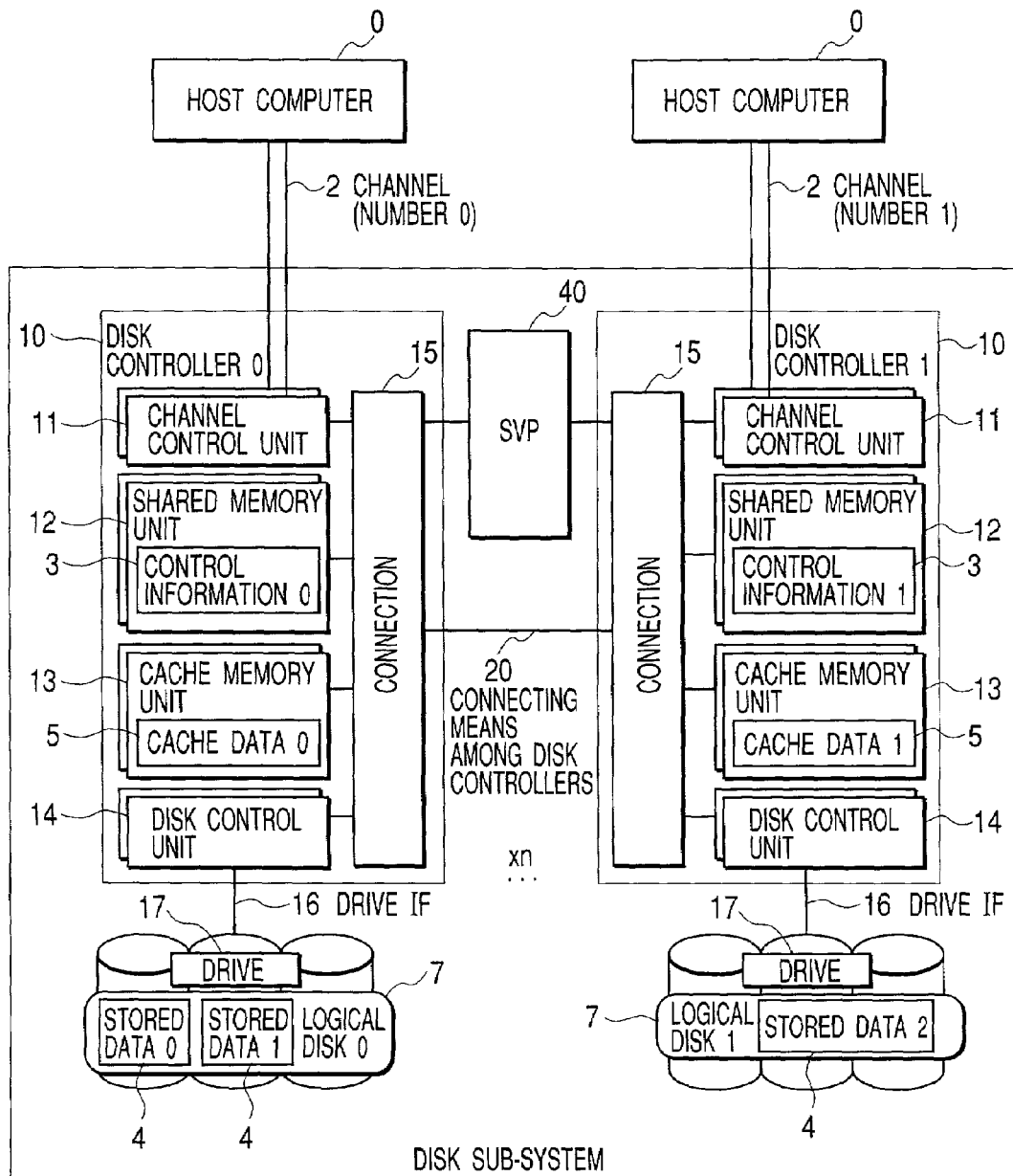
FIG. 3 is an example of a block diagram showing an outline of a conventional disk control unit.

Hereafter, a detailed description of the invention will be given referring to the drawings. First, FIG. 1 will be used to describe the disk control unit according to this invention. FIG. 1 is an example of a block diagram showing an outline of the disk control unit according to this invention. Plural DKC 10, a switch 30 and plural drives form a disk subsystem 1. The disk subsystem 1 is connected with plural host computers 0 via plural channels 2. The switch 30 transmits requests from the host computer 0 to the relevant DKC 10 based on a distribution table 31. Each DKC 10 can be updated via a disk controller connecting means 20 which connects the DKC 10 by looking up data 4 stored in a drive 17 connected to the other DKC. In particular, according to this invention, the switch 30 receives an access request from the host computer 0, and forwards the corresponding access request to a channel control unit 11 of the relevant DKC 10 based on the access request destination and the distribution table 31.

Hereafter, before giving a detailed explanation, the terminology to be used will be defined. In this invention, a channel control unit 11 of the DKC10 used as the destination of the access request from the host computer 0 is referred to as the destination channel control unit. The channel control unit 11 which received a corresponding access request by a forwarding of the switch 30 is referred to as a request receiving channel control unit or proxy channel control unit. The handling of the corresponding access request by the proxy channel control unit is referred to as proxy, and the processing is referred to as proxy processing. The situation where the proxy channel control unit interrupts proxy processing in an intermediate step and another channel control unit continues processing is referred to as continuation, and this processing is referred to as continuation processing. The situation where the proxy channel control unit performs all the processing on the access request is referred to as complete proxy, and the processing is then referred to as full proxy processing.

The disk subsystem 1 shown in FIG. 1 broadly comprises plural DKC 10, the drive 17 and the switch 30. Only two DKC 10 are shown in detail, but the construction of each DKC 10 is identical. The DKC 10 broadly comprises the channel control unit 11 which controls the channels, a disk control unit 14 which controls the drives, a shared memory unit 12 which stores control information 3 of the disk subsystem 1, a cache memory 13 which temporarily holds data of the drive 17 as cache data 5, and a connection 15 which interconnects each component unit. The channel control unit 11 may have plural channels in a single channel control unit. However, in the following description, for simplification, the channel control unit only has one channel 2. Therefore, the identifier of the channel control unit described later coincides with the identifier of the channel. The shared memory unit 12 also stores directory information of the data in the cache memory 13, and determines whether or not the requested data exists in the cache memory 13. The shared memory unit 12 also stores system information, and can identify the disk controller number and drive number of the access request destination from the address of the access request destination. Although not shown, the channel control unit 11 and disk control unit 14 comprise control processors, and execute control programs in the processors. The switch 30 comprises a distribution table 31.

Figure 4:
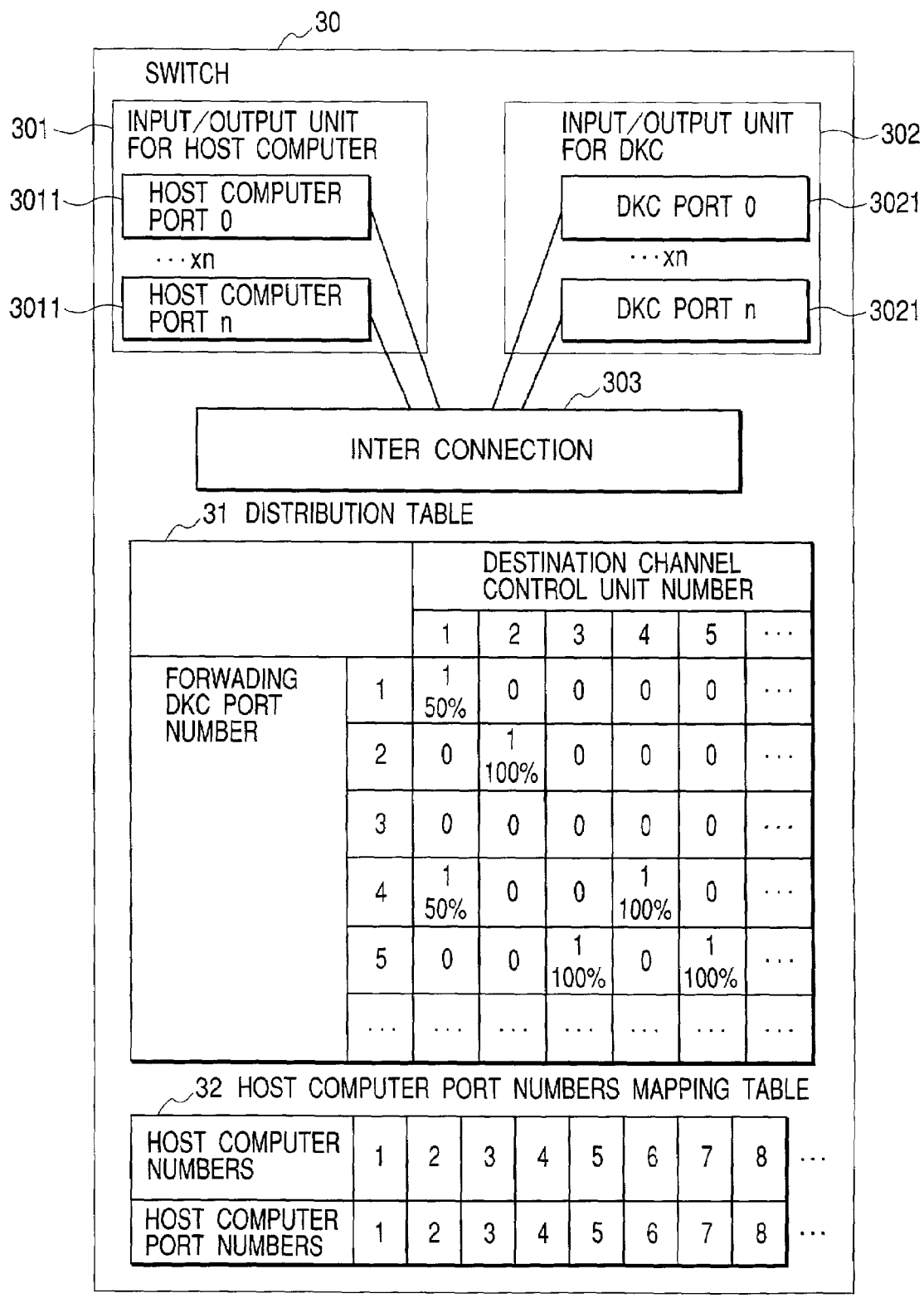
FIG. 4 is an example of a block diagram showing a channel-DKC switch of the disk control unit according to this invention.

FIG. 4 is a block diagram showing an example of the switch 30 in FIG. 1 and the information stored by the distribution table 31 with which the channel-DKC switch is provided. The channel-DKC switch comprises a host computer input/output unit 301 connected to the host computer 0 via a channel, and a DKC input/output unit 302 connected to the DKC. The host computer input/output unit 301 comprises plural host ports 3011, and the DKC input/output unit 302 comprises plural DKC ports 3021. These are connected via an interconnection 303 so that data transfer with any desired host port 3011 is possible via any desired DKC port 3021. In general, the ports all have identifiers. For example, in the case of an Internet protocol, this is a MAC address, and in the case of a fibre channel protocol, this is WWN. Here, for the sake of generalization, the ports will be denoted by numbers, the identifier of the channel control units will be denoted by a channel control unit number and the host computer will be identified by a host computer number. In the switch 30, regarding data originating from the DKC, the corresponding DKC port forwards data to the corresponding host port based on a host computer port number mapping table 32. Data originating from the host computer (access request) is forwards based on the distribution table 31.

The distribution table 31 holds correspondence information for the destination channel control unit of the access request from the host computer and the DKC port number to which this request is transferred. According to this embodiment, when an element of the request to the forwarding DKC port number corresponding to the destination channel control unit to which the access request from the host computer is made, is 0, the corresponding destination request is not forwarded to the forwarding DKC port 3021. In all other cases, requests for the corresponding channel control unit number which is the destination, are candidates for the DKC port 3021. Here, the destination candidate is set to 1 as in the upper stage of the element, or the respective probabilities are shown as in the lower stage of the element. In the former method, when plural destinations are 1, the destination channel control unit is selected by a method such as round-robin. The latter method will be described later using FIG. 25. The elements of the distribution table 31 shown in FIG. 4 of this embodiment correspond to the situation when the channel control unit having the channel control unit number 3 has a fault, and the channel control unit having the channel control unit number 1 is under high load. The column for which the destination channel control unit number of the distribution table 31 is 3, shows that the channel control unit having the channel control unit number 5 processes access requests instead of the channel control unit having the channel control unit number 3 which has a fault. The column for which the destination channel control unit number is 1, shows that the channel control unit 4 processes requests for the channel control unit number 1 which is under high load, half of the time. The distribution table 31 has a feature that it can set plural destinations for one address. By using the distribution table 31, the original request for the destination channel control unit can be divided among the other channel control units, which disperses the load on the channel control unit 11 and allows faults to be handled.

Figure 5:
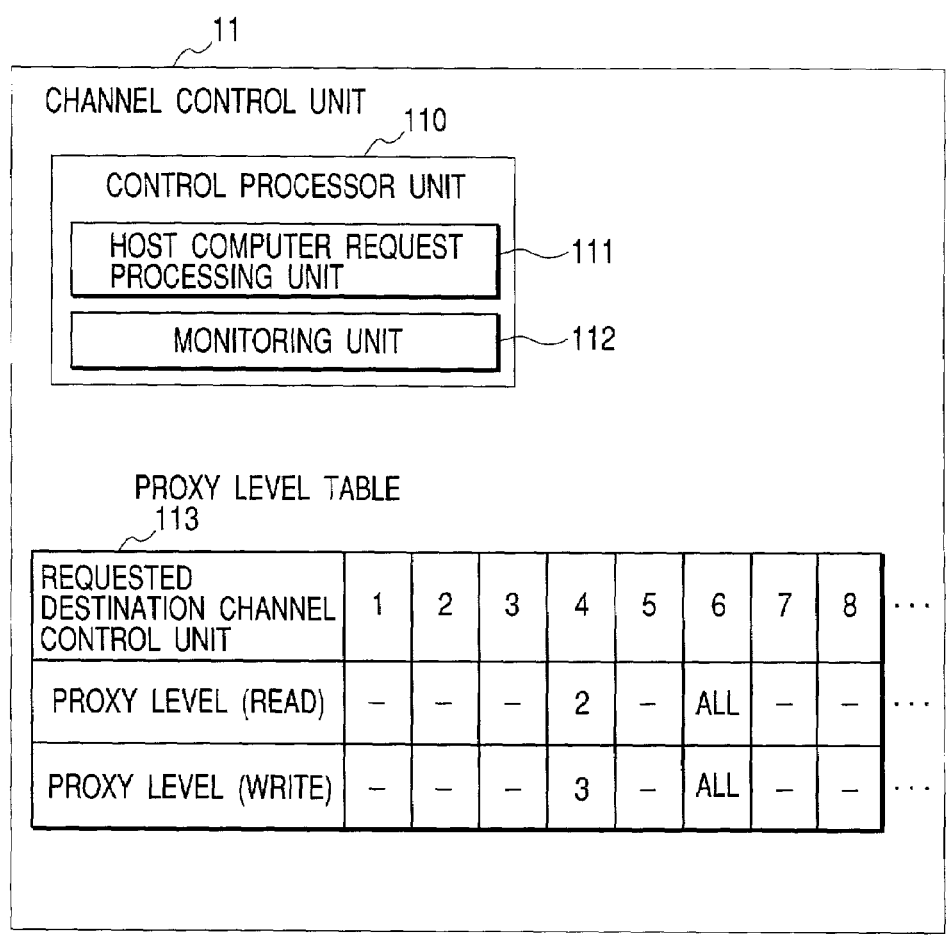
FIG. 5 is an example of a block diagram showing a channel control unit of the disk control unit according to this invention.

FIG. 5 is a block diagram showing an example of the information stored in a proxy level table 113 with which the channel control unit 11 of FIG. 1 is provided. The channel control unit comprises a control processor unit 110, and the control processor unit 110 comprises a host request processing unit 111 and a monitoring unit 112.

The access requests from the host computer received by the channel control unit 11 are processed by the host request processing unit 111. The monitoring unit 112 reports the status of the channel control unit 11 to the SVP40. According to this embodiment, the channel control unit 11 comprises the proxy level table 113, but this proxy level table can also be provided in the shared memory unit 12.

The proxy level table 113 holds proxy level information specifying up to which step the channel control unit which receives the request should process information instead of the destination channel control unit. For example, assume that a read request during caching miss by the channel control unit 11 proceeds via command analysis (step 1), cache hit determination (step 2), request to the disk controller to perform staging which stores the drive data in the cache (step 3), staging complete determination (step 4) and data transfer (step 5). In the proxy level table 113 of this embodiment, in the case when a read request is sent to channel control unit number 4, the corresponding channel control unit performs processing up to step 2, i.e., up to the cache hit determination, and the processing of the step 3 and subsequent steps is performed by the channel control unit having the channel control unit number 4. For access requests to the channel control unit number 6, the corresponding channel control unit performs all processing from step 1 to step 5 (full proxy). According to this embodiment, the proxy level is different for read/write accesses, but a proxy level table specifying identical proxy levels for read and write accesses can also be used.

Figure 6:
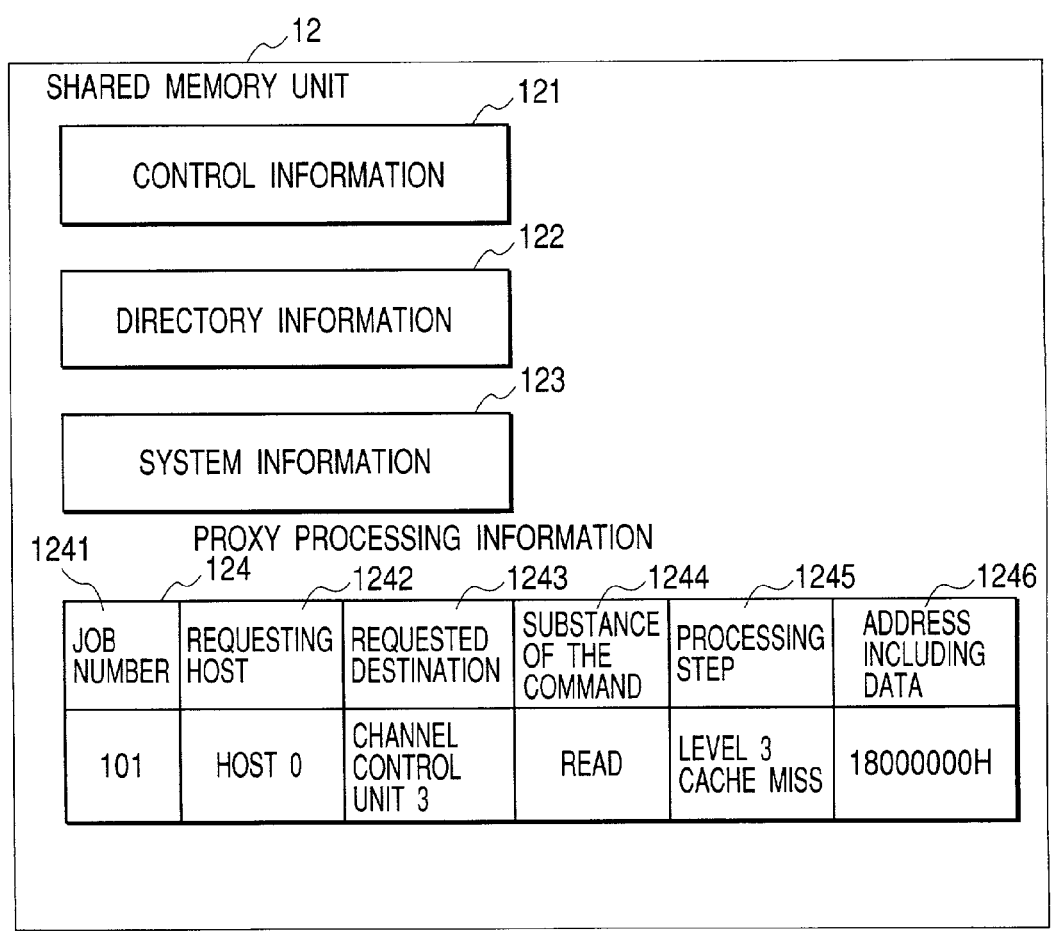
FIG. 6 is an example of a block diagram showing a shared memory unit of the disk control unit according to this invention.

FIG. 6 is a block diagram showing an example of the information stored as proxy processing information 124 with which the shared memory unit 12 of FIG. 1 is provided. The shared memory unit 12 comprises control information 121, directory information 122, system information 123 and the proxy processing information 124. The control information 121 is information used for system control, for example when the channel control unit 11 makes a staging request for data to the disk control unit 14. The directory information 122 shows correspondences of devices where data is stored. The system information 123 holds information such as the presence and capacity of each unit. Next, the proxy processing information 124 will be described.

The proxy processing information 124 is information relating to continuation of processing, and comprises a job number 1241, requesting host 1242, requested destination 1243, command substance 1244, processing step 1245, and address with data 1246. The job number 1241 is an identification number relating to access request processing, and is used to request data transfer by the disk control unit. The requesting host 1242 is an identifier of the host computer 0 which made the access request. The requested destination 1243 is the original destination channel control unit identifier of the request issued by the corresponding host computer 0. By looking up the requested destination 1243, channel control units other than the corresponding requested destination can write information to the effect that a response has been given to the request from the corresponding requested destination channel control unit, in the response. The command substance 1244 is information showing whether or not the analysis result of the channel control unit which received the request, is read or write, etc. The processing step 1245 is information showing the step up to which the channel control unit which received the request has performed processing. The processing step 1245 comprises information relating to the progress of processing such as cache hit/miss, etc. The address with data 1246 shows the address where the data obtained in the proxy processing step is located.

According to this embodiment, the proxy processing information 124 is stored in the shared memory unit 12, but the proxy processing information 124 can also be transferred as a message between channel control units.

Figure 20:
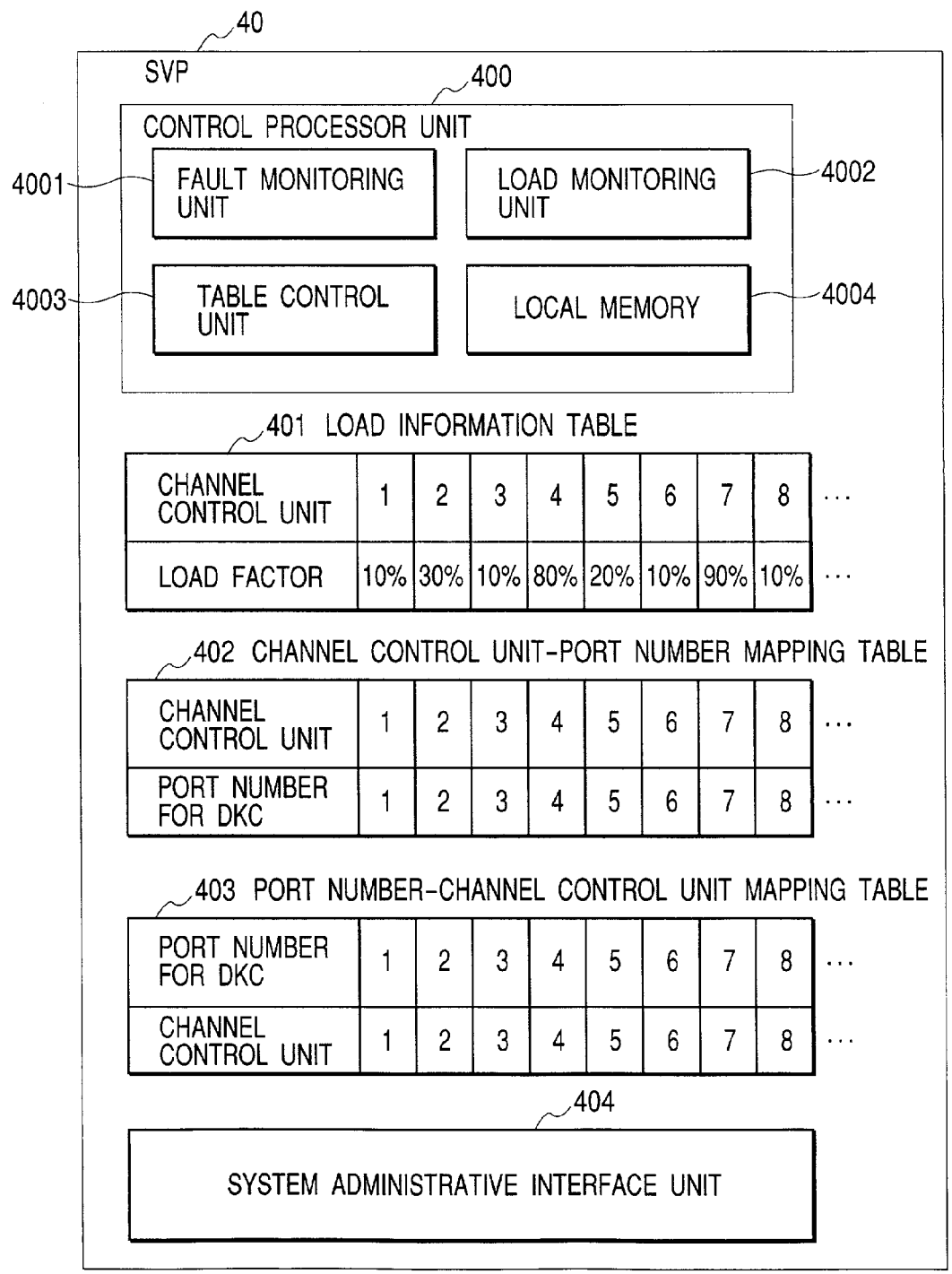
FIG. 20 is an example of a block diagram showing the SVP of a disk control unit according to this invention.

FIG. 20 shows the details of the SVP40 in FIG. 1. The SVP40 comprises a control processor 400, load information table 401, channel control unit-port number mapping table 402, port number-channel control unit mapping table 403, and system administrative interface unit 404. The control processor 400 comprises a fault monitoring unit 4001, load monitoring unit 4002, table control unit 4003, and local memory 4004. The fault monitoring unit 4001 is a part which has the function of receiving reports of regular accesses or faults from each part of the disk subsystem 1, and manages fault information for each unit of the disk subsystem 1. The load monitoring unit 4002 has the function of measuring the load factor of each unit of the disk subsystem 1 by receiving reports from each unit, and manages the load status of each unit. The table control unit 4003 has the function of modifying the distribution table 31 or proxy level table 113. The local memory 4004 stores temporary information required for performing the sequence of processes, such as storing the results sorted in order of load factor. The system administrative interface unit 404 is an input/output interface unit for the system administrator to make system settings or verify the status of the system. The load information table 401 stores load factors for each channel control unit obtained by the load monitoring unit 4002. By looking up the load information table 401, the channel control units can be sorted in order of load factor, for example. The channel control unit-port number mapping table 402 and port number-channel control unit mapping table 403 hold correspondence information for the numbers of the channel control unit 11 and numbers of the DKC port 3021. In this way, the distribution table 31 can be updated by the SVP40, described later, whatever the relation between the numbers of the channel control unit 11 and numbers of the DKC port 3021.

When the SVP40 looks up or updates the distribution table 31, it compares the channel control unit-port number mapping table 402 or port number-channel control unit mapping table 403, and thus determines the DKC port number corresponding to the actual channel control unit number. Hereafter, for simplification, the term "row of the corresponding destination channel control unit" will be used to indicate the fact that the SVP already knows the DKC port number corresponding to the channel control unit number.

According to this embodiment, the load information table 401, channel control unit-port number mapping table 402 and port number-channel control unit mapping table 403 are stored in the SVP40, but they may also be stored in the shared memory unit 12 or switch 30.

Next, the control performed by the channel control unit 11 and SVP40 will be described with reference to flowcharts. This control makes it possible to perform load balancing and fail-over by having the switch 30 transfer access requests to a channel control unit other than the corresponding channel control unit when the first channel control unit is under heavy load or has a fault. This invention broadly proposes two types of control. One type is full proxy, when the channel control unit which receives the access request performs all the processing. The other type is proxy continuation, where the channel control unit which receives the access request performs processing up to an intermediate step (proxy), and the channel control unit which was the original destination of the access request then continues the processing to complete access request processing (Continuation). The control of the channel control unit 11 relative to a read/write request, the control of the SVP40 when the channel control unit has a fault or recovers from a fault, and the control of the SVP40 when an imbalance occurs in the load between channel control units, will now be described for each of these two types. Here, the elements of the distribution table 31 may be two values showing whether or not units are destination candidates, or the probability that they are destinations. The various methods of controlling the SVP40 will now be described for each form of the distribution table.

First, the control will be described for full proxy.

Figure 7:
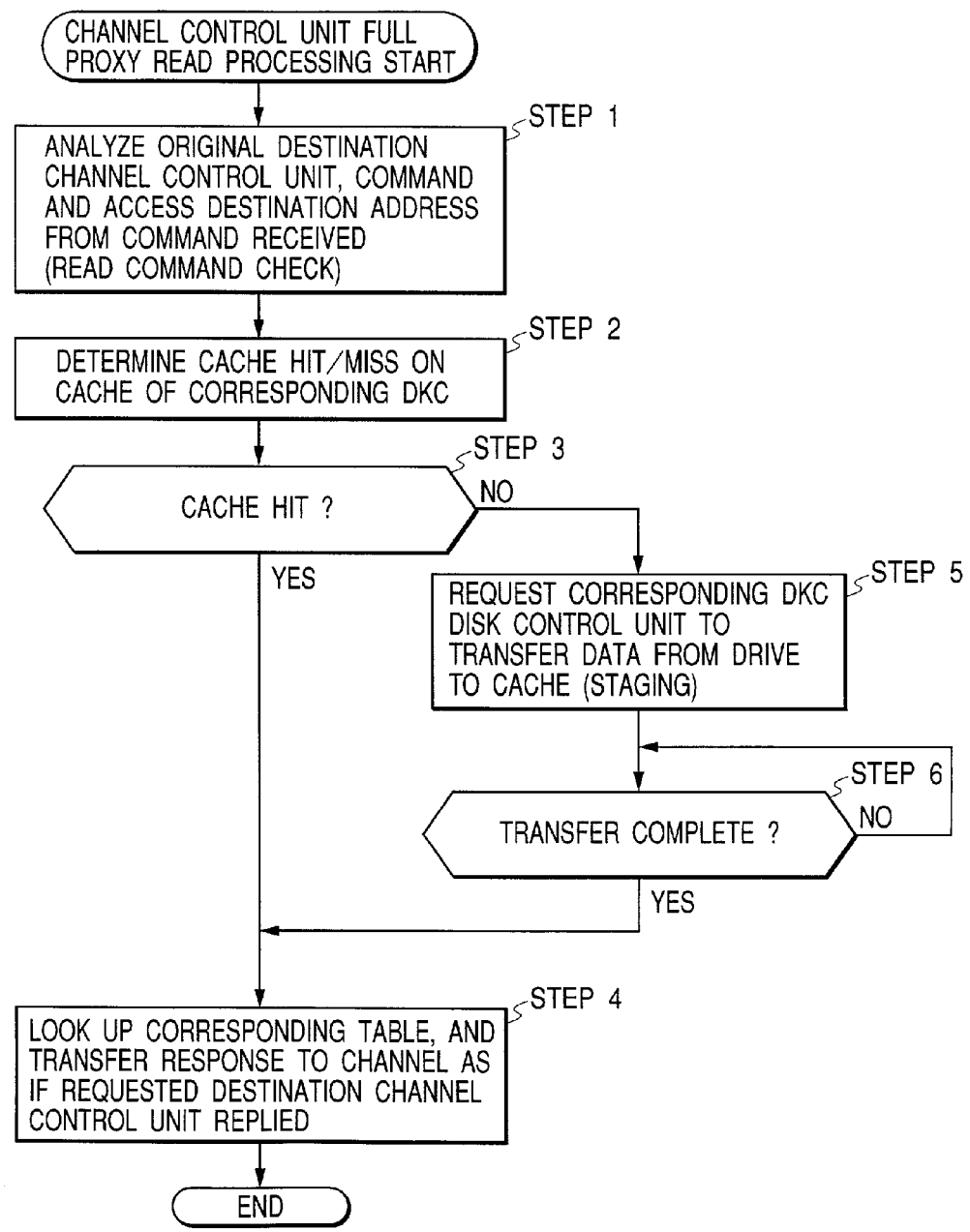
FIG. 7 is a flowchart showing an example of full proxy read request processing of a channel control unit of the disk control unit according to this invention.
Figure 8:
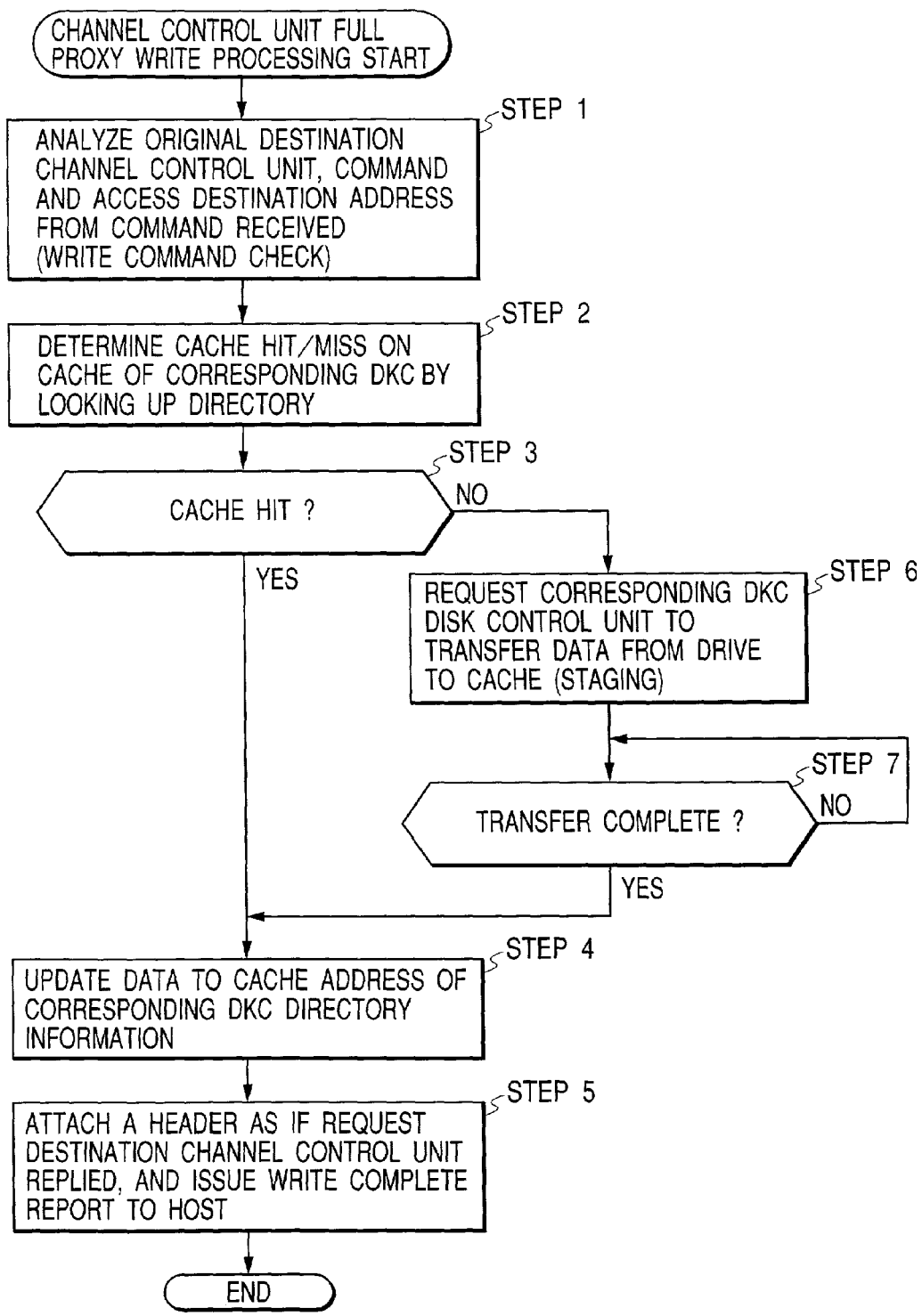
FIG. 8 is a flowchart showing an example of a full proxy write request processing of the channel control unit of the disk control unit according to this invention.
Figure 9:
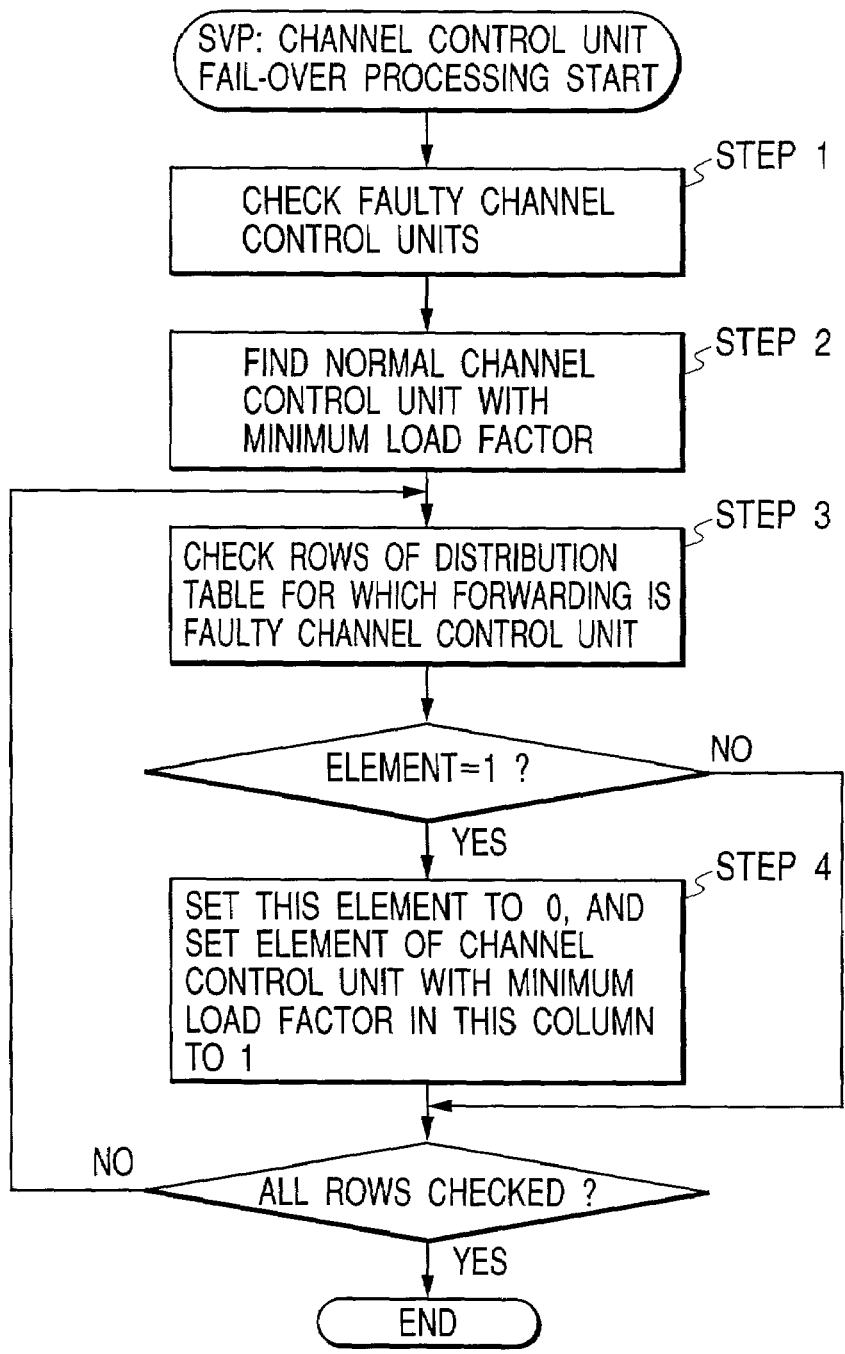
FIG. 9 is a flowchart showing an example of fail-over processing due to a channel control unit fault performed by a SVP of the disk control unit according to this invention.
Figure 10:
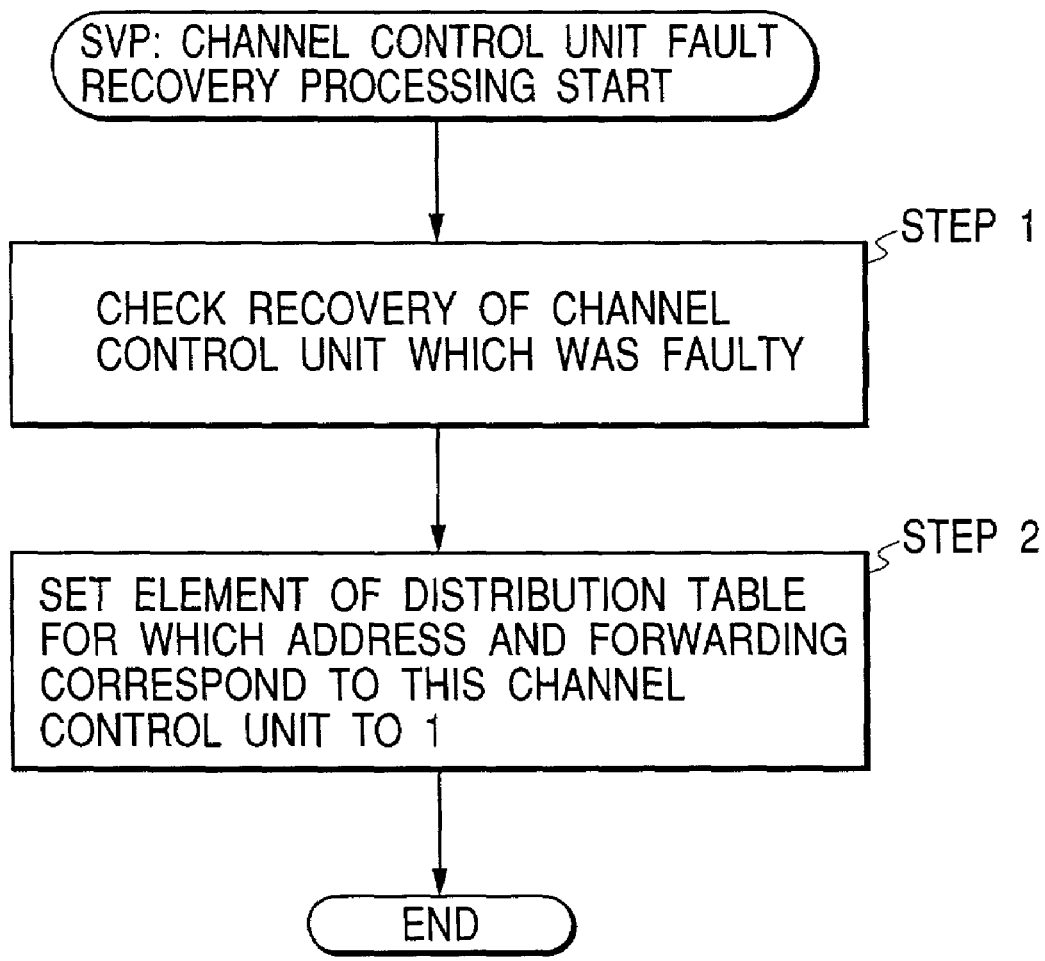
FIG. 10 is a flowchart showing an example when a channel control unit fault has recovered due to the SVP of the disk control unit according to this invention.
Figure 11:
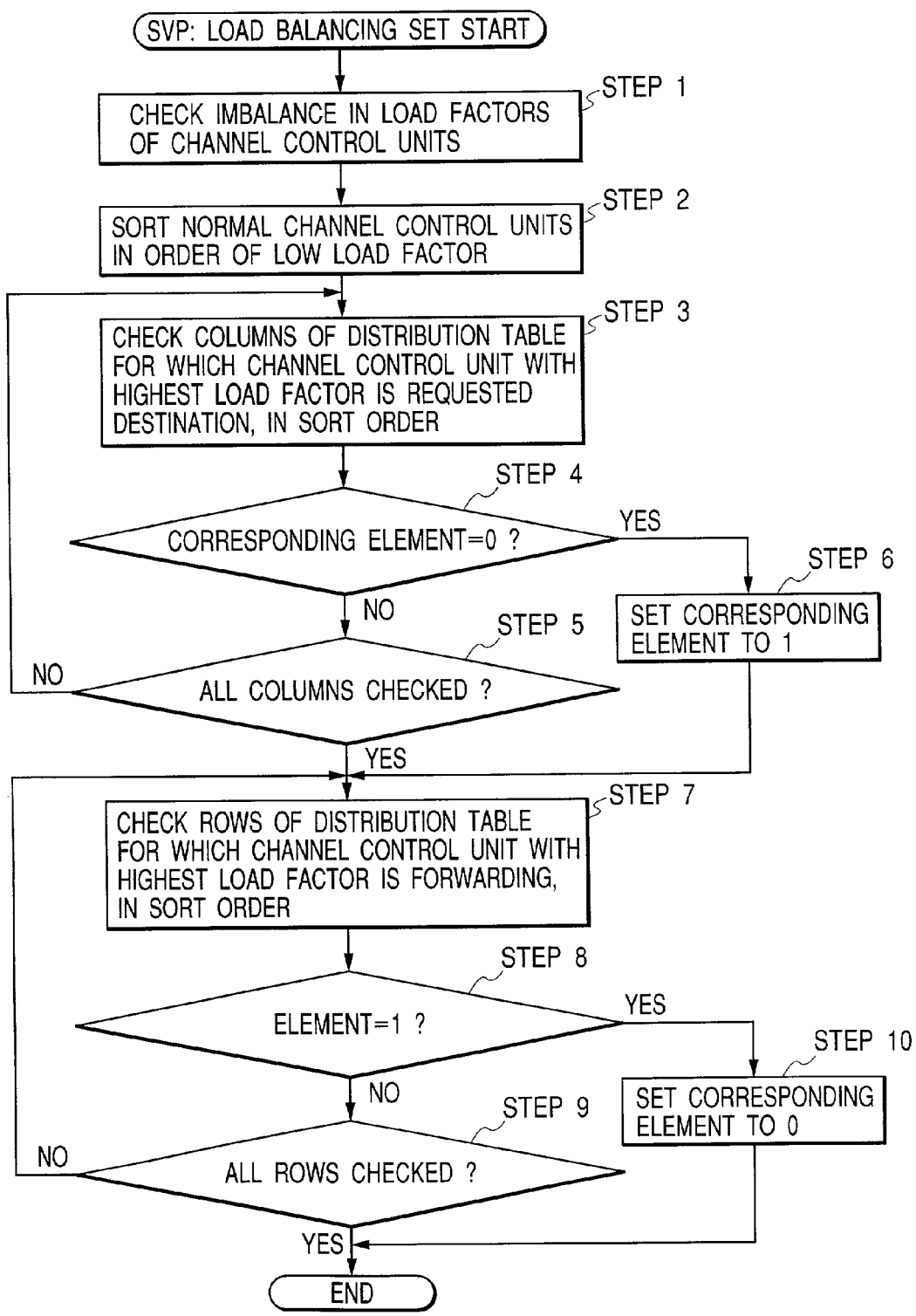
FIG. 11 is a flowchart showing an example of processing when the SVP of the disk control unit according to this invention performs load balancing of the channel control unit.
Figure 12:
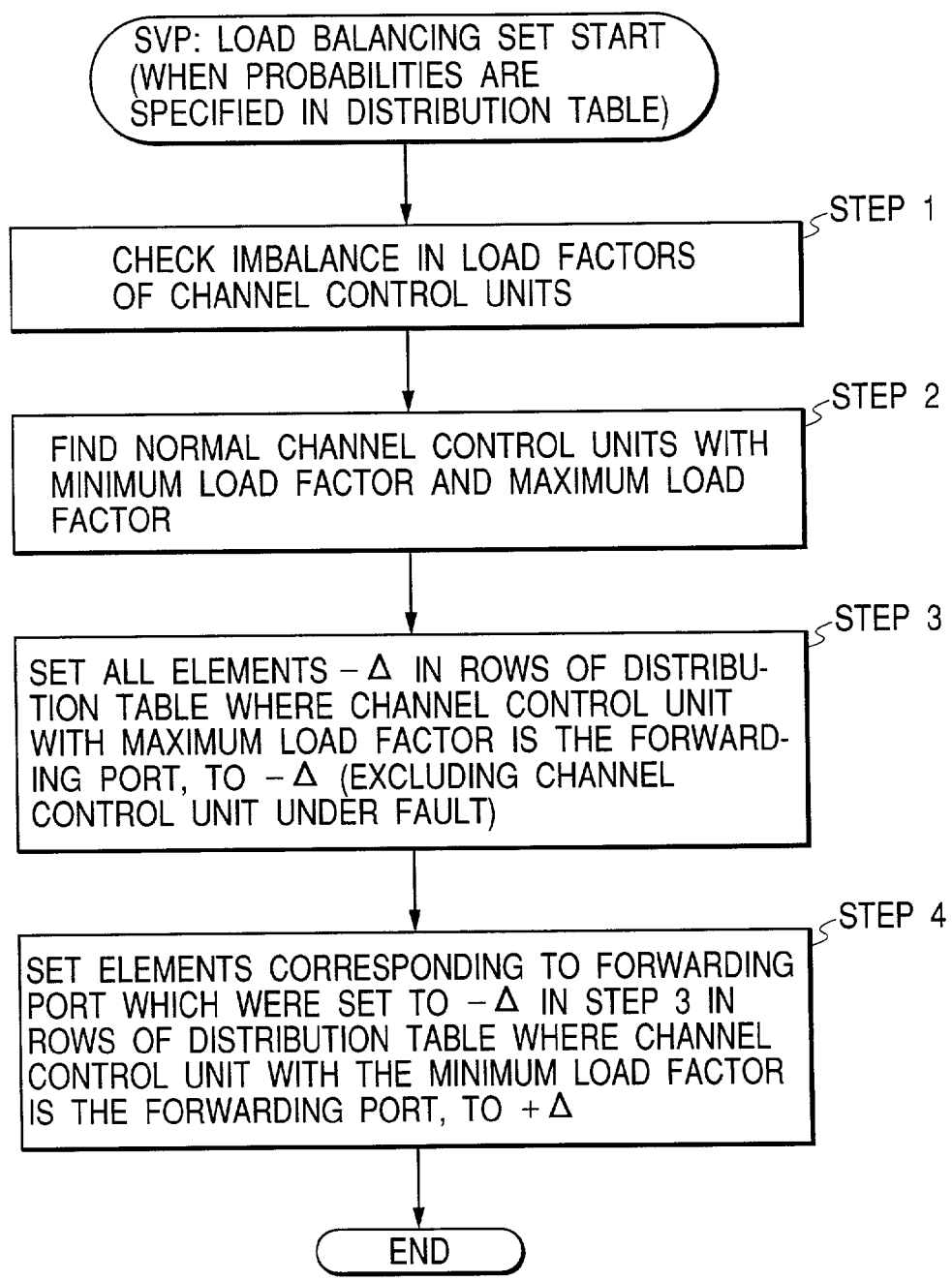
FIG. 12 is a flowchart showing an example of processing when the SVP of the disk control unit according to this invention performs load balancing of the channel control unit.
Figure 13:
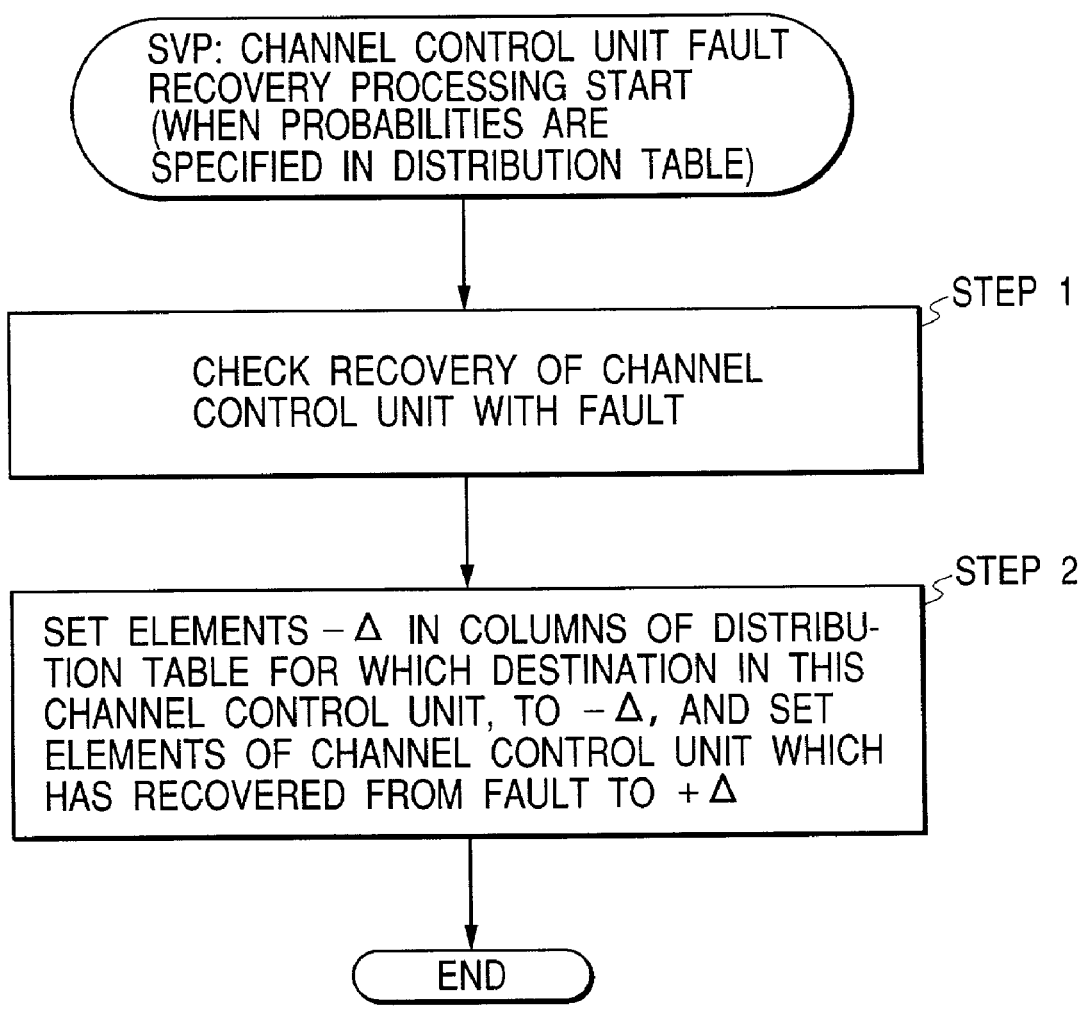
FIG. 13 is a flowchart showing an example of processing by the SVP of the disk control unit when a channel control unit fault has recovered.
Figure 14:
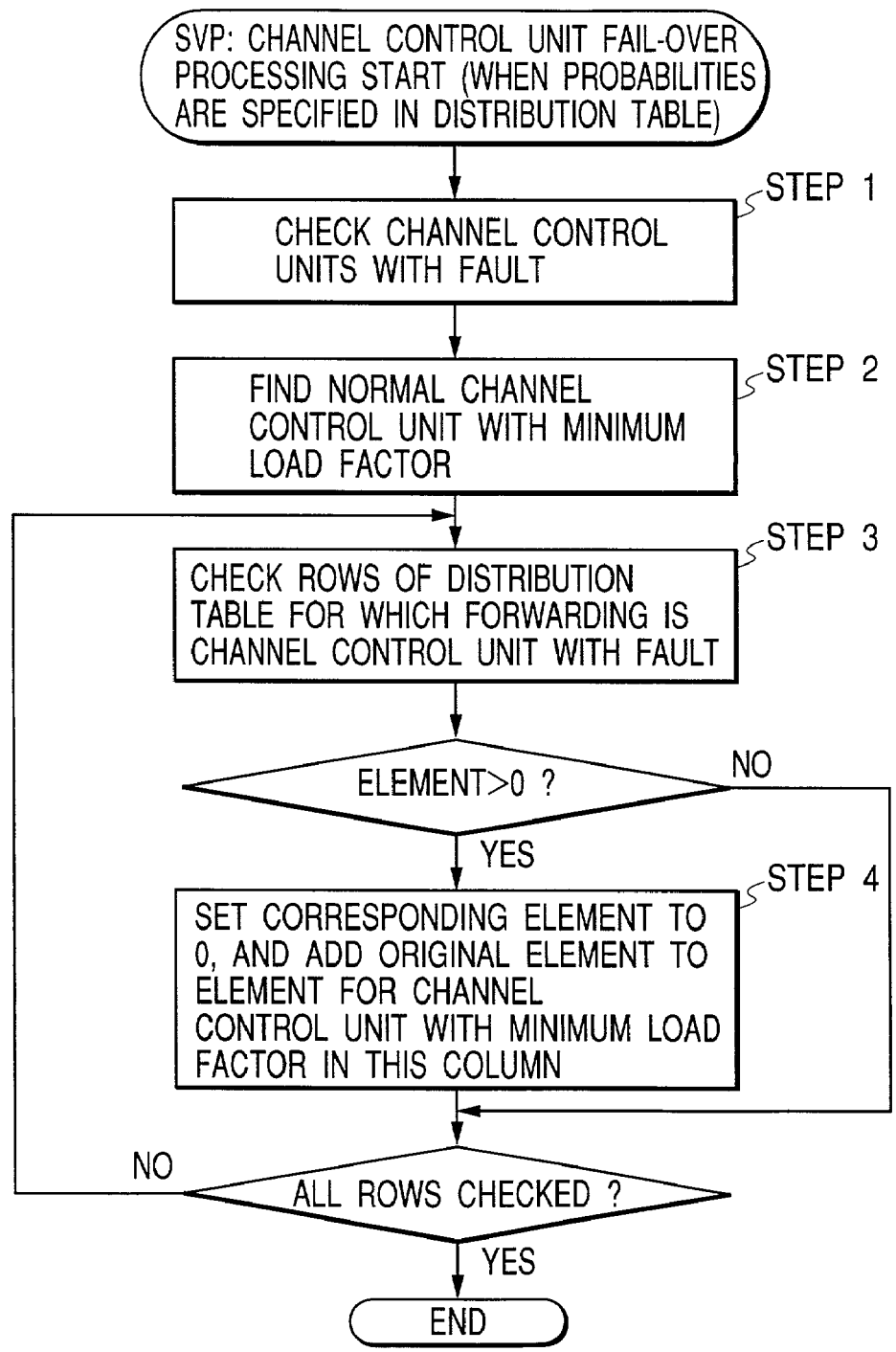
FIG. 14 is a flowchart showing an example of fail-over processing of a channel control unit fault by the SVP of the disk control unit according to this invention.

FIG. 7 is a flowchart showing the method of controlling the channel control unit 11 for a read access request, and FIG. 8 is a flowchart showing the method of controlling the channel control unit 11 for a write access request. FIG. 9 shows, as a flowchart, a control method where the SVP40 avoids faults in the channel control unit by modifying the distribution table 31 in a system comprising a channel control unit using this method. Likewise, FIG. 10 shows, as a flowchart, the control by the SVP when the corresponding channel control unit recovers from a fault. FIG. 11 shows control by the SVP when an imbalance occurs in the load between the channel control units, and the load is balanced by modifying the distribution table to reduce the proportion of access requests transmitted to the channel control unit under heavy load. FIG. 9, FIG. 10, and FIG. 11 are all examples showing the case where the elements of the distribution table are two values indicating whether or not units are destination candidates. FIG. 14, FIG. 13, and FIG. 12 show corresponding examples where the elements of the distribution table show the probability that units are destinations.

FIG. 7 is a flowchart showing an example of the processing performed when a read request is received. When a read request is received, the channel control unit which is the original requested destination, the command, and the access address are analyzed from the request received, and it is recognized that this is a read access (step 1). In the access forwarding address, the disk control unit number and drive number of the access request can be identified by looking up the system information 123 of the shared memory unit 12. Next, a cache hit/miss determination is performed on the cache of the corresponding DKC identified in step 1 (step 2). By looking up the directory information 122 of the shared memory unit 12, it can be determined whether access destination data is held in the cache. Hence, it is determined whether it is held in the cache (step 3), and in the case of a cache miss when it is not held in the cache, a request is issued to the disk controller of the corresponding DKC to transfer the data from the corresponding drive to the cache (step 5). Normally, this processing is referred to as staging. In this case, read processing is interrupted until transfer is complete (step 6) and after staging is complete, read processing is resumed. The cache address to which the data is transferred can be managed and acquired by any of the usual methods such as cache opening lists, but the transfer address must be registered by updating the directory information 122. When a hit is determined in the step 3, or when staging is complete in the step 7, the corresponding data is transferred to the host computer (step 4). In the step 4, even when the controller which performed processing is different from the access request destination of the host computer, the identifier of the original destination channel control unit which is different from that of this channel control unit is assigned to the reply data to denote the issuer of the reply data, and the data is transferred as if the original destination channel control unit replied. This point is a feature of this embodiment.

FIG. 8 is a flowchart showing an example of the processing performed when a write request is received. When a write request is received, the channel control unit which is the original requested destination, the command and the access address are analyzed from the request received, and it is recognized that this is a write command (step 1). In the access forwarding address, the disk control unit number and drive number of the access request can be identified by looking up the system information 123 of the shared memory unit 12. Next, a cache hit/miss determination is performed on the cache of the corresponding DKC identified in step 1 (step 2). By looking up the directory information 122 of the shared memory unit 12, it can be determined whether access destination data is held in the cache. In the event of a cache miss when it is not held in the cache, a request is issued to the disk controller of the corresponding DKC to transfer the data from the corresponding drive to the cache (step 6). Normally, this processing as referred to as staging. In this case, write processing is interrupted until transfer is complete (step 7), and after staging is complete, write processing is resumed. The cache address to which the data is transferred can be managed and acquired by any of the usual methods such as cache opening lists, but the transfer address must be registered by updating the directory information 122. When a hit is determined in the step 3, or when staging is complete in the step 7, this data is updated to the cache of the corresponding DKC (step 4). After updating is complete, a report showing that write processing is complete is issued to the host computer (step 5). In the step 5, even if the controller which performed processing is different from the access request destination of the host computer, the completion report is made as if the original destination channel control unit replied. This point is a feature of this embodiment.

FIG. 9 is a flowchart showing an example of the processing of the SVP40 which performs a fail-over of the corresponding channel control unit when one of the channel control units 11 develops a fault. The elements of the distribution table 31 updated by the SVP will be described in the case where they are two values showing whether or not units are destination candidates. Here, the channel control unit which has a fault will be referred to as the faulty channel control unit. First, the fault monitoring unit 4001 of the SVP40 confirms that the channel control unit has a fault (step 1). Next, the load monitoring unit 4002 finds the channel control unit with the minimum load factor by looking up the load factors of normal channel control units in a fault information table 401 (step 2). Subsequently, by looking up the distribution table 31, the rows where the requested destination channel control unit is the faulty channel control units are progressively checked (step 3). When the corresponding element is 1, i.e., when the switch 30 was transferring requests to the faulty channel control unit, this element is set to 0 so that requests are not transferred to the faulty channel control unit. Also, the element for the channel control units for which the requested destination channel control unit in this column of elements has the lowest load factor, is set to 1 to avoid the situation where there is no requested destination channel control unit (step 4). Step 3, step 4 are continued until a check has been completed on all rows.

FIG. 10 is a flowchart showing an example of processing performed when the SVP40 updates the distribution table 31, when a faulty channel control unit recovers from a fault. The case will be described where the elements of the distribution table 31 updated by the SVP are two values indicating whether or not destinations are candidates. The fault monitoring unit 4001 of the SVP40 checks whether the faulty channel control unit has recovered from the fault (step 1). Upon receiving this information, the element of the distribution table 31 for which the requested destination channel control unit column and requested channel control unit row is this particular channel control unit, is set to 1, and a request is sent to this channel control unit (step 2). The channel control unit which performed fail-over of this channel control unit then modifies the distribution table 31 which is the aim of the load balancing of this and subsequent processing, and progressively releases the proxy.

FIG. 11 is a flowchart showing an example of the processing performed by the SVP40 when an imbalance occurs in the load of channel control units 11. First, it is checked that there is an imbalance in the load factor of the channel control units from the load information table 401 obtained by the load monitoring unit 4002 of the SVP40 (step 1). An imbalance in the load factor is defined as, for example, the case where the difference between the maximum load factor and minimum load factor exceeds a threshold value. Next, the channel control units are sorted in order of load factor (step 2). From this result, the distribution table 31 is updated so that the load of the channel control unit with the highest load factor decreases. The columns of the distribution table in which the requested destination channel control unit is this channel control unit with the highest load factor, are checked in the sort order of step 2 (step 3). If this element is 0, the element is set to 1 to register the channel control unit as a load balancing destination (step 6). If this element is 1, the next element is checked. After all elements have been checked or after completing the step 6, rows of the distribution table for which the requested destination channel control unit is this channel control unit with the highest load factor are checked in the sort order of step 2 (step 7). If this element is 1, the element is set to 0, and the channel control unit with the highest load factor is deleted from the load balancing destinations (step 10). If this element is 0, the next element is checked. After all elements have been checked or after completing the step 10, this routine is terminated.

FIG. 12 is a flowchart showing the processing of the SVP40 when an imbalance occurs in the load of the channel control units 11. The case will be described where the elements of the distribution table 31 updated by the SVP show probabilities that channel control units will be destinations. First, from the load information table 401 obtained by the load monitoring unit 4002 of the SVP40, it is checked whether there is an imbalance in the load factors of the channel control units (step 1). Next, the normal channel control units with the maximum load factor and minimum load factor are selected (step 2). In the case of rows for which the channel control unit with the maximum load factor in the distribution table 31 is the destination, A is subtracted from all elements equal to $\Delta$ or more (step 3). In this case, the element corresponding to the channel control unit which had a fault is excluded. Further, in the case of rows for which the channel control unit with the minimum load factor in the distribution table is the forwarding port, $\Delta$ is added to the elements corresponding to forwarding ports subtracted in the step 3 (step 4).

FIG. 13 is a flowchart showing an example of processing performed when the SVP40 updates the distribution table 31 when a faulty channel control unit recovers from a fault. The case will be described where the elements of the distribution table 31 updated by the SVP show probabilities that channel control units will be destinations. First, the fault monitoring unit 4001 of the SVP40 checks whether the faulty channel control unit has recovered from the fault (step 1). Upon receiving this information, for columns where the address of the distribution table 31 is this channel control unit, $\Delta$ is subtracted for elements equal to a constant $\Delta$ or more. For elements in the column of the faulty channel control unit corresponding to this, $\Delta$ is added (step 2).

FIG. 14 is a flowchart showing an example of the processing performed by the SVP40 when a channel control unit 11 develops a fault, and fail-over is performed. The case will be described where the elements of the distribution table 31 updated by the SVP show probabilities that channel control units will be destinations. Here, the channel control unit which has a fault is referred to as the faulty channel control unit. The fault monitoring unit 4001 of the SVP40 first checks whether the faulty channel control unit is present (Step 1). Next, load factors of normal channel control units are looked up from the load information table 401 obtained by the load monitoring unit 4002, and the channel control unit with the lowest load factor is found (step 2). Subsequently, the distribution table 31 is looked up, and the rows for which the requested destination channel control unit is the faulty channel control unit are progressively checked (step 3). When this element is greater than 0, i.e., when the switch 30 was transferring requests to the faulty channel control unit, this element is set to 0 so that requests are not transferred to the faulty channel control unit, and the original element of the faulty channel control unit is added to the element for the channel control unit with the lowest load factor (step 4). Step 3, step 4 are continued for all corresponding rows until termination.

Figure 15:
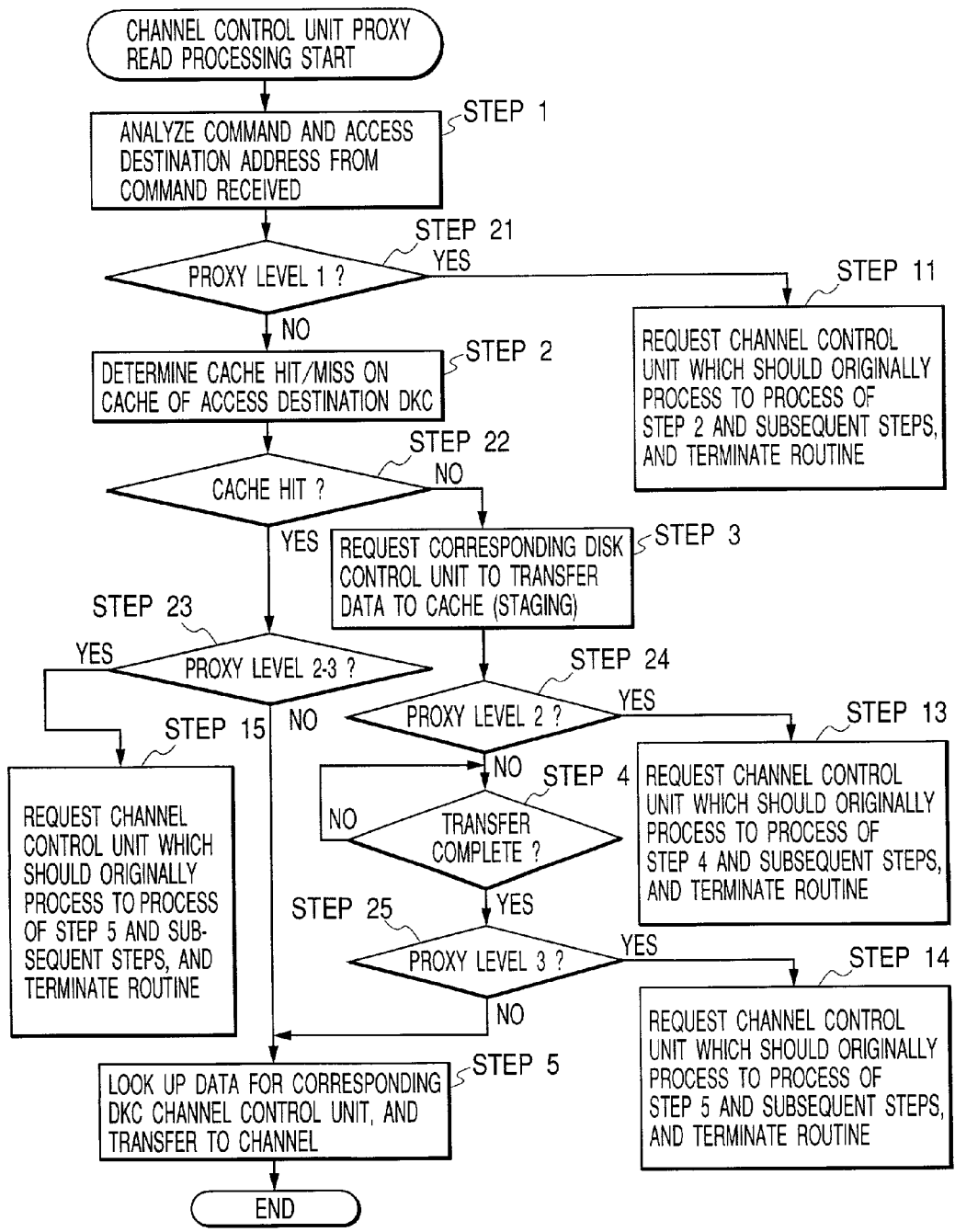
FIG. 15 is a flowchart showing an example of proxy read request processing of a channel control unit of the disk control unit according to this invention.
Figure 16:
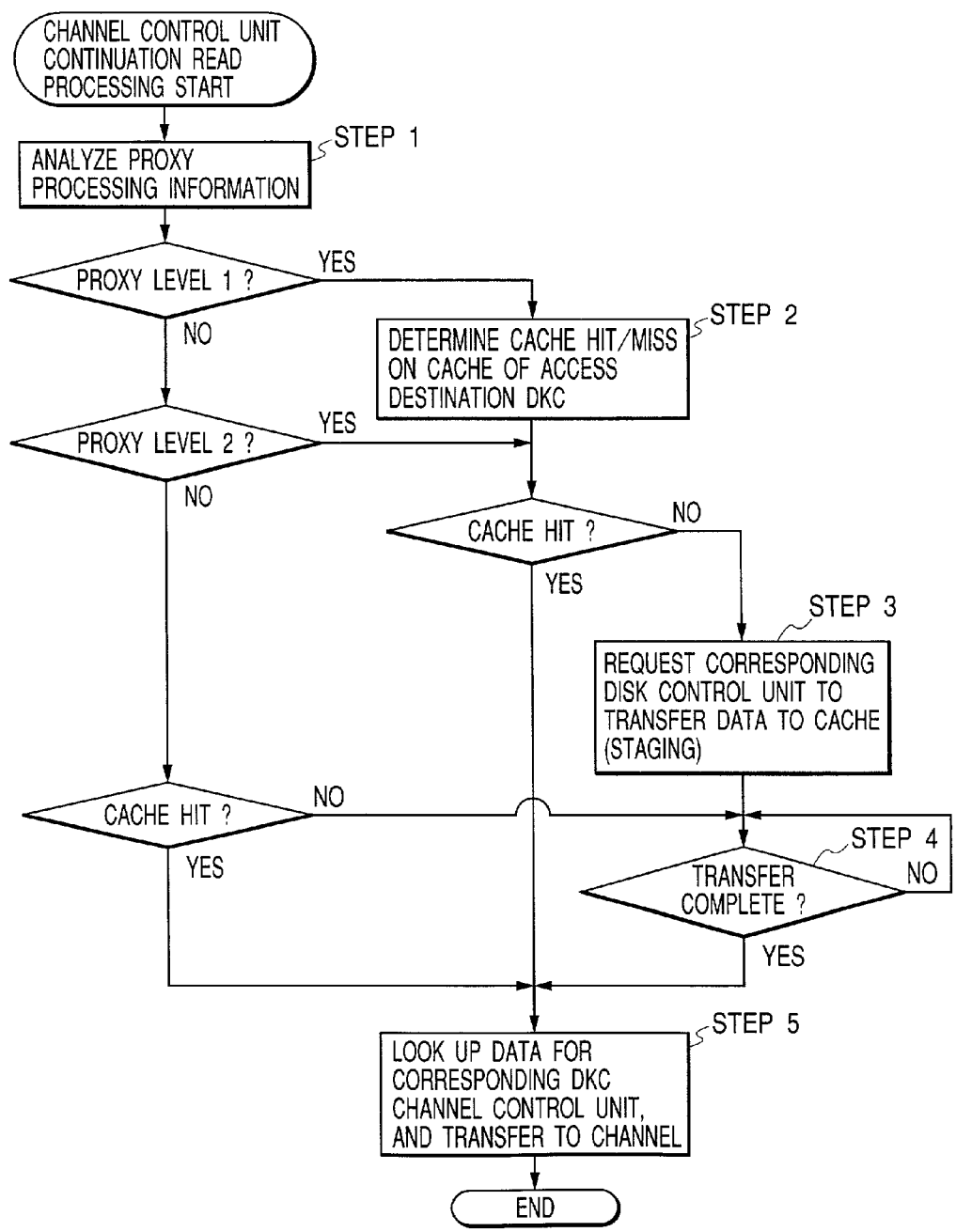
FIG. 16 is a flowchart showing an example of proxy continuation read request processing of the channel control unit of the disk control unit according to this invention.
Figure 17:
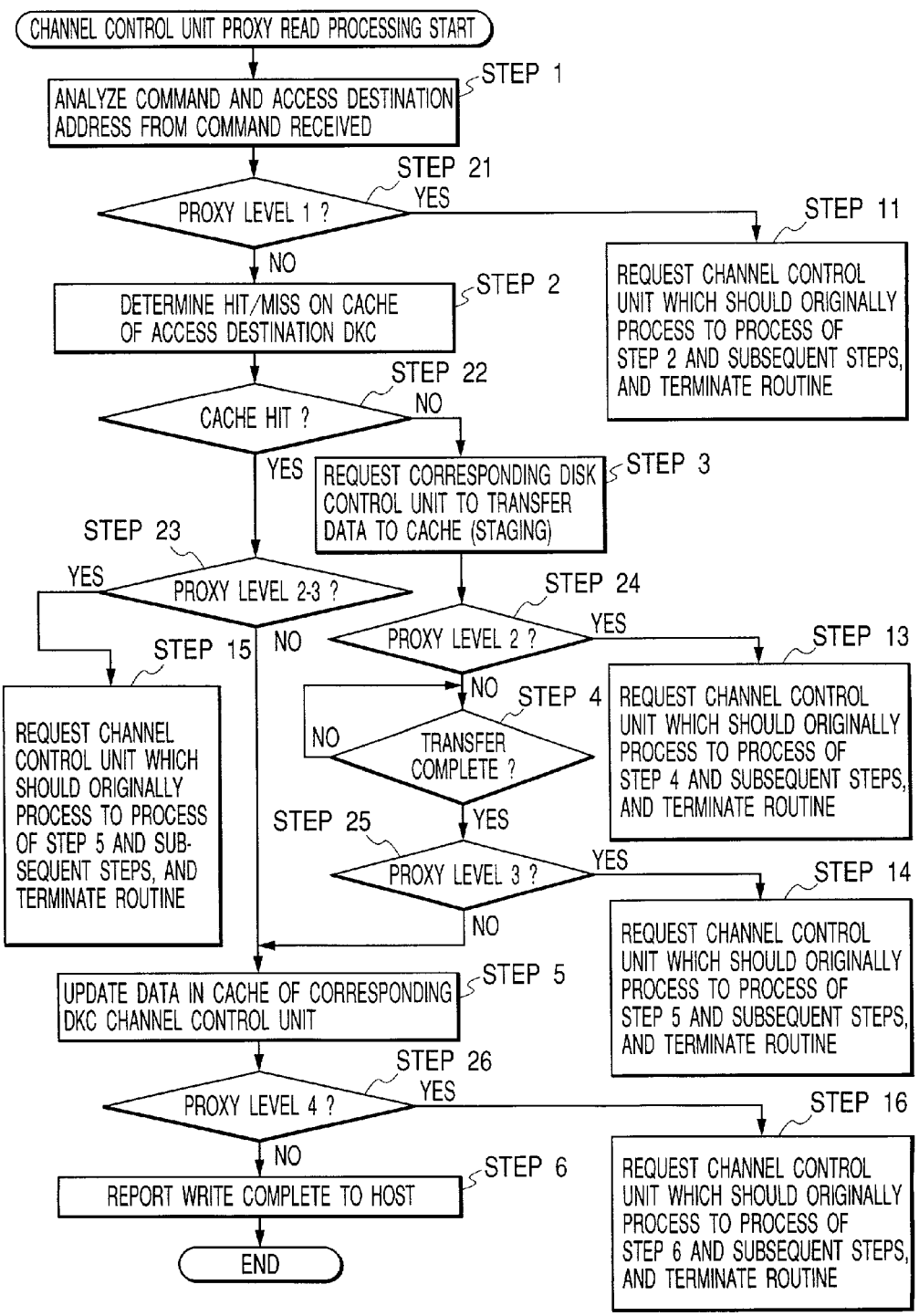
FIG. 17 is a flowchart showing an example of proxy write request processing of a channel control unit of the disk control unit according to this invention.
Figure 18:
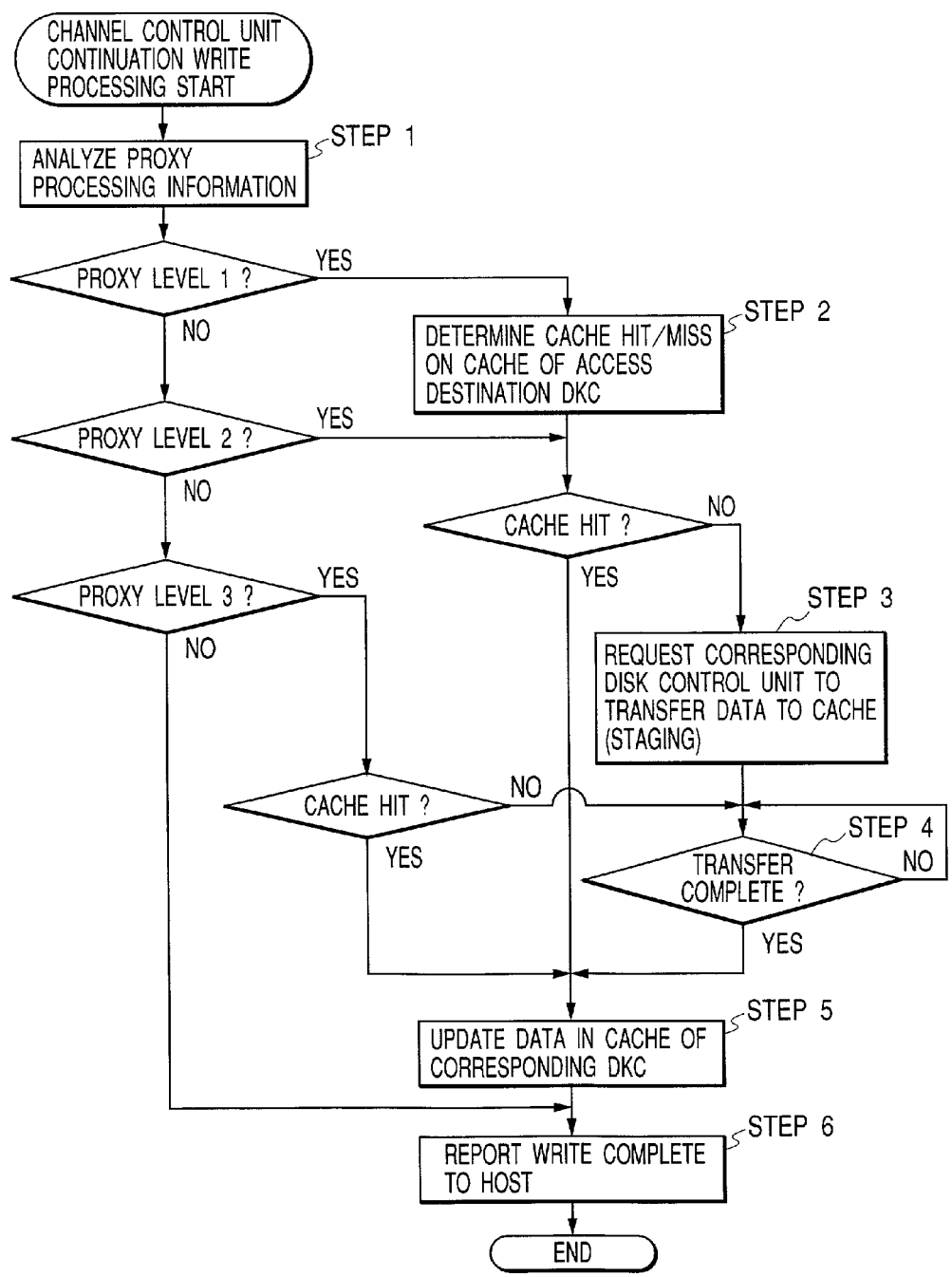
FIG. 18 is a flowchart showing an example of proxy continuation write request processing of a channel control unit of the disk control unit according to this invention.
Figure 19:
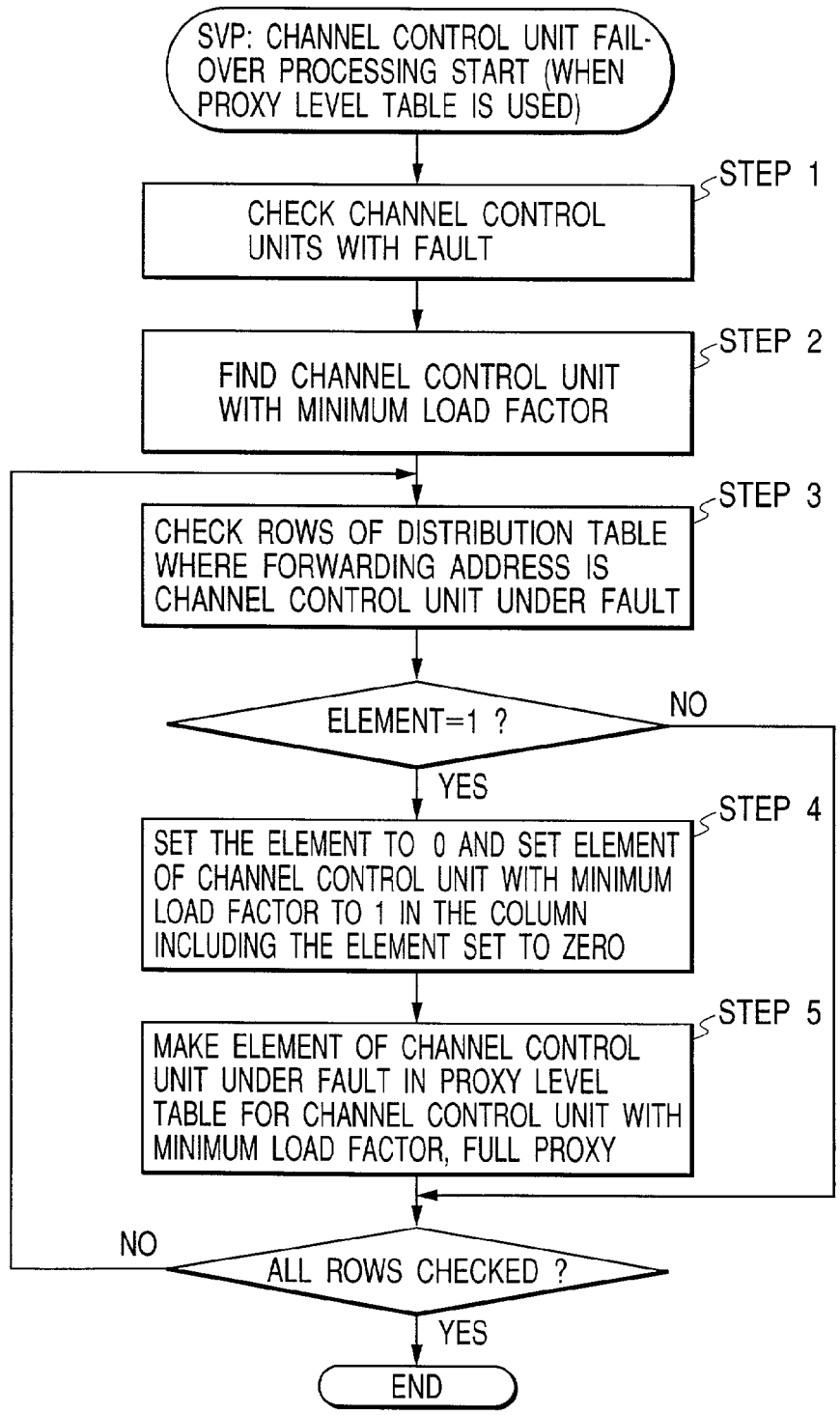
FIG. 19 is a flowchart showing an example of fail-over processing of a channel control unit fault by the SVP of the disk control unit according to this invention.
Figure 21:
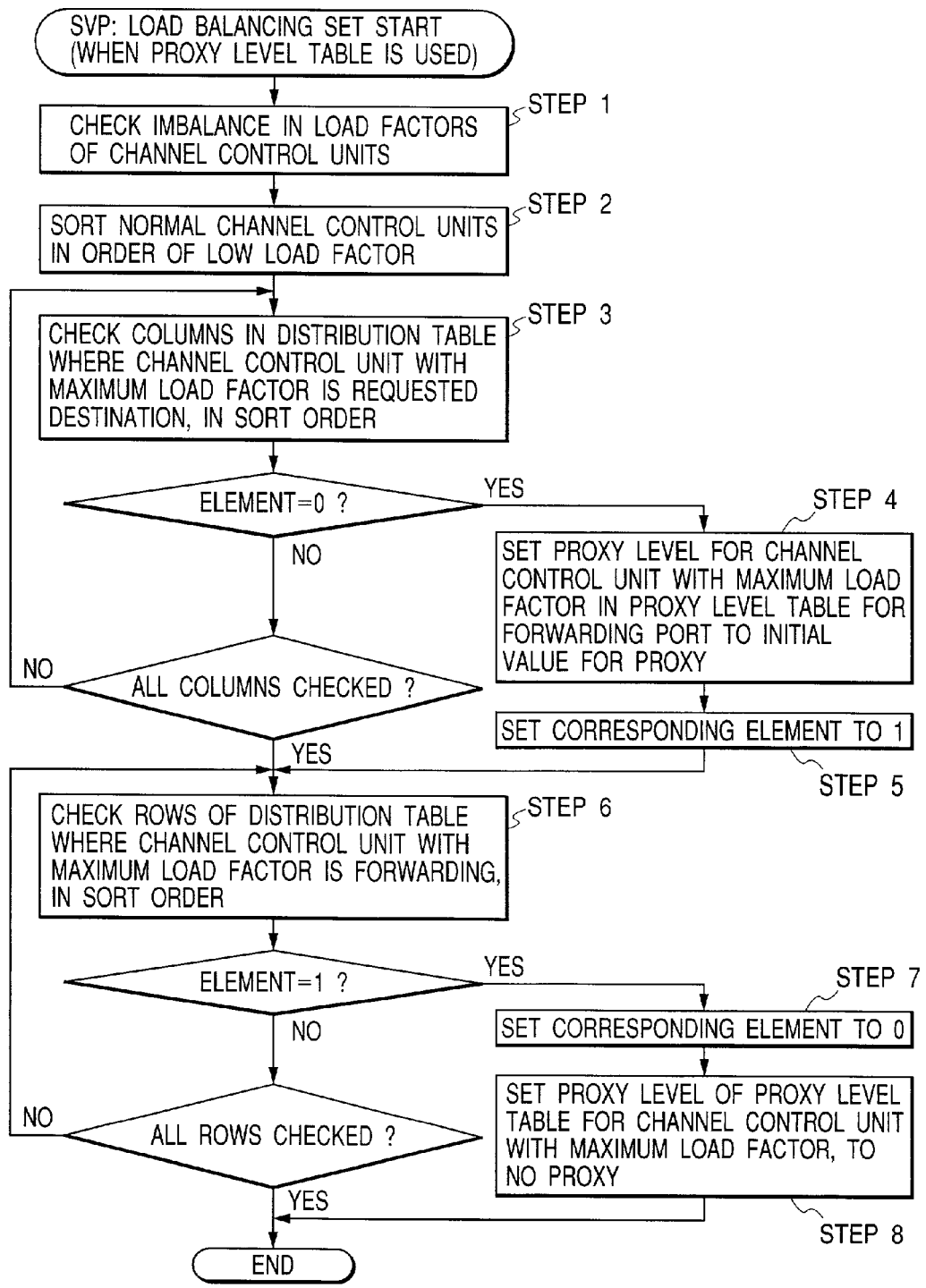
FIG. 21 is a flowchart showing an example of processing when the SVP of the disk control unit according to this invention performs load balancing of a channel control unit.
Figure 22:
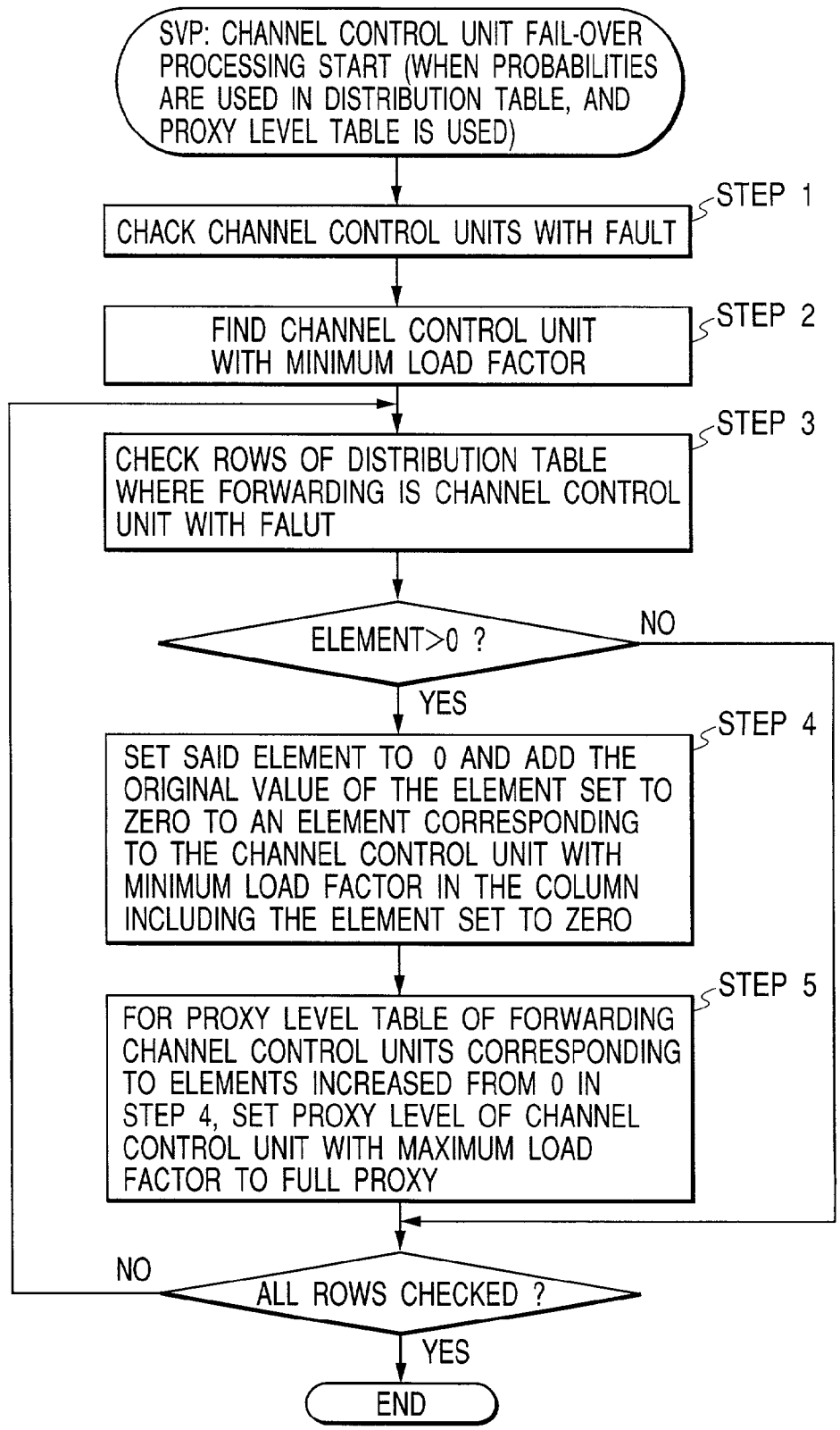
FIG. 22 is a flowchart showing an example of fail-over processing of a channel control unit fault by the SVP of the disk control unit according to this invention.
Figure 23:
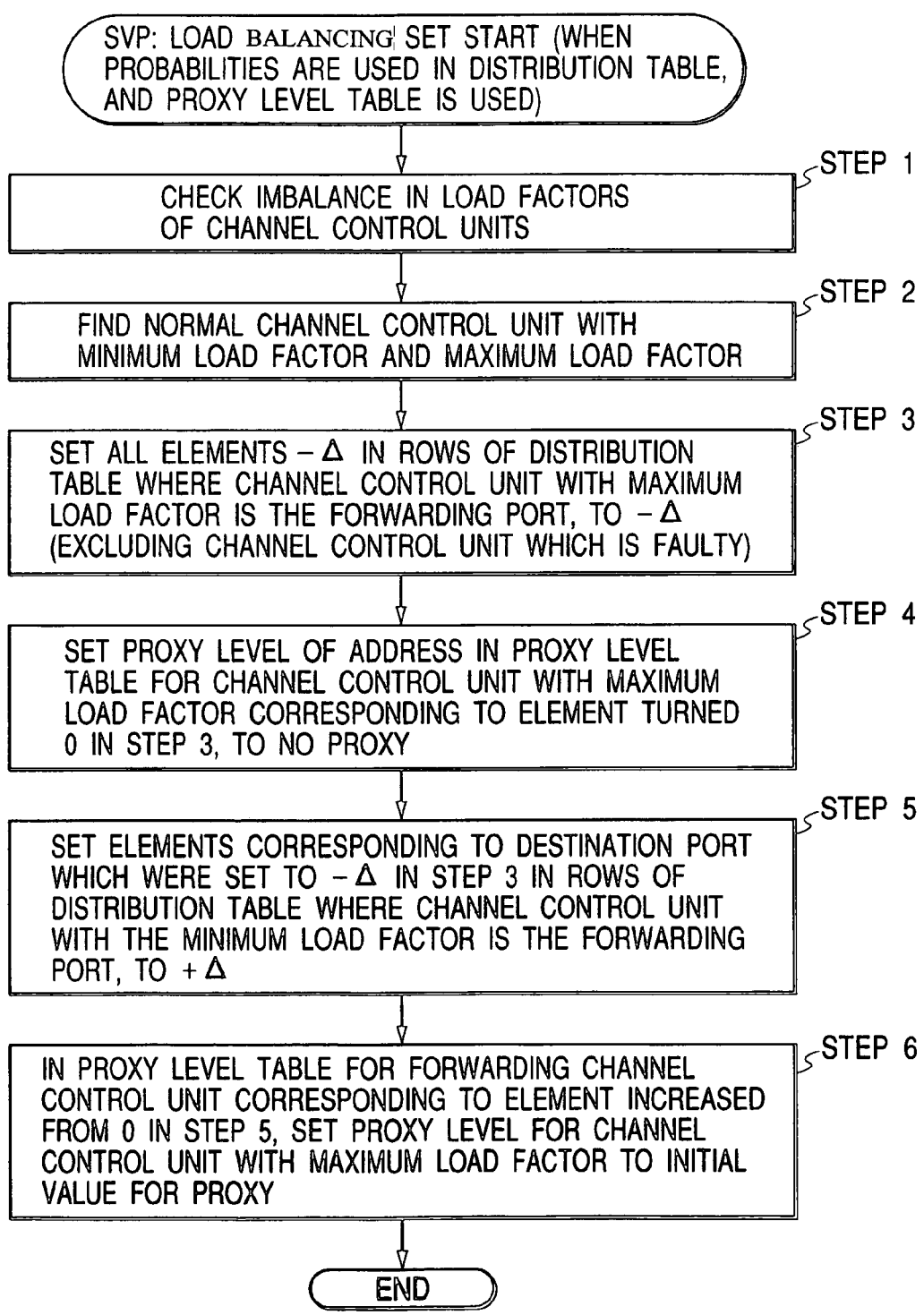
FIG. 23 is a flowchart showing an example of processing when the SVP of the disk control unit according to this invention performs load balancing of the channel control unit.
Figure 24:
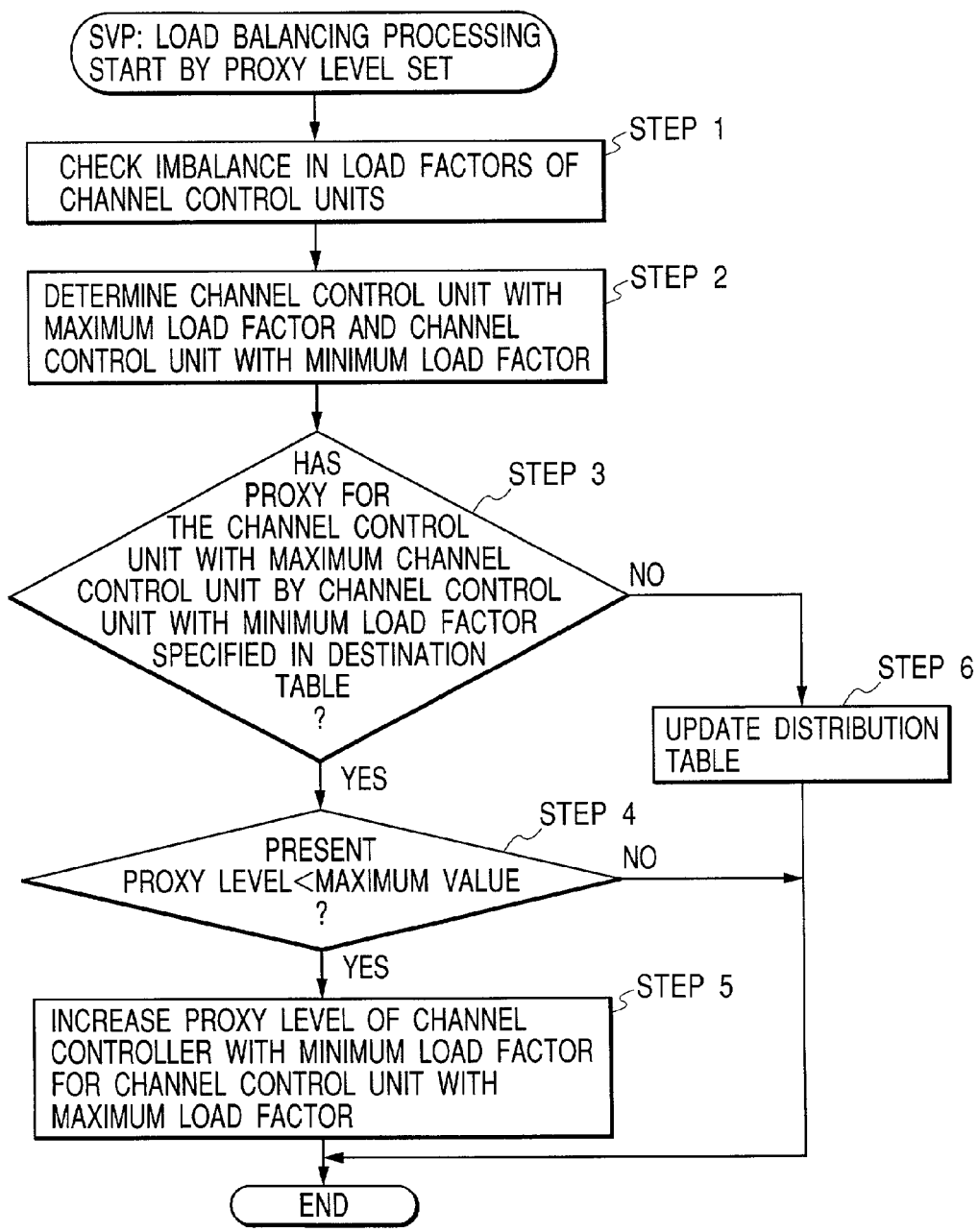
FIG. 24 is a flowchart showing an example of processing when the SVP of the disk control unit according to this invention performs load balancing of the channel control unit.

Next, the method of proxy continuation control will be described. When the channel control unit 11 which is the destination of a read access request is under heavy load, and the switch 30 was transferring read requests to another channel control unit, the channel control unit 11 which received the read request performs proxy processing up to an intermediate step, and the original destination channel control unit then continues the processing of the remaining steps. FIG. 15 shows the proxy processing of the channel control unit to which read requests were being transferred, and FIG. 16 shows a flowchart of the continuation processing performed by the original address channel control unit in this case. FIG. 17, FIG. 18 correspond to FIG. 15, FIG. 16 in the case of a write access request. FIG. 19 is a flowchart showing a system comprising a channel control unit which performs control by this method, wherein the SVP40 avoids a fault in the channel control units by modifying the distribution table 31. This is a control method specifying full proxy by modifying the proxy level table 113 of the channel control unit which performs fail-over. As in the case of full proxy, FIG. 10 is a flowchart showing the SVP control method when this channel control unit has recovered from the fault. Also, FIG. 21 shows the SVP control method for balancing the load by modifying the distribution table 31 when an imbalance has appeared in the load of the channel control units to reduce the proportion of access requests transferred to a channel control unit, and set the proxy level of the load balancing destination channel control unit by the proxy level table 113. FIG. 19, FIG. 10, FIG. 21 all show examples where the elements of the distribution table are two values indicating whether or not controllers are destination candidates. FIG. 22, FIG. 13, FIG. 23 show corresponding examples where the elements of the distribution table are probabilities indicating destinations. FIG. 24 is a flowchart showing the control method of the SVP40 when a more detailed load distribution is set by modifying the proxy level.

FIG. 15 is a flowchart showing an example of processing when a read request is received. It is a feature of this example that the request receiving channel control unit performs processing up to the step set in the proxy level table 113, and the processing of the remaining steps is performed by the requested destination channel control unit.

When the read request is received, the original requested destination channel control unit, command, and access address are analyzed from the request received, and it is verified that this is a read access (step 1). The access address identifies the disk control unit number and drive number of the access request address by looking up the system information 123 in the shared memory unit 12. Next, the proxy level relative to this channel control unit is acquired by looking up the proxy level table 113. When the proxy level is 1, processing is continued by displaying the proxy processing information 124 to the requested destination channel control unit, and the request receiving channel control unit terminates the routine (step 11). In this example, the proxy processing information 124 is displayed via the shared memory unit 12, however the proxy processing information 124 may be directly displayed to the channel control unit by a message or the like. When the proxy level is 2 or more, a cache hit/miss determination is performed on the corresponding DKC cache which was identified in the step 1 (step 2). In the event of a cache miss when data is not held in the cache, a request is made to the corresponding DKC disk control unit to transfer data from the drive to the cache (step 3). Here, when the proxy level is 2, processing is continued by displaying the proxy processing information 124 to the requested destination channel control unit, and the request receiving channel control unit terminates the routine (step 13). When the proxy level is 3 or higher, read processing is interrupted until transfer is complete (step 6), and after staging is complete, read processing is resumed. Here, when the corresponding proxy level is 3, processing is continued by displaying the proxy level information 124 to the requested destination channel control unit, and the request receiving channel control unit terminates the routine (step 14). When a hit is determined in the step 3, and when the corresponding proxy level is 2 or higher, processing is continued by displaying the proxy processing information 124 to the requested destination channel control unit, and the request receiving channel control unit terminates the routine (step 15). Subsequently, or when staging has been completed in the step 4, this data is transferred to the host computer (step 5). In the step 5, even if the channel control unit which performs processing is different from the access request destination of the host computer, data is transferred as if the original destination channel control unit replied.

FIG. 16 is a flowchart showing an example of continuation of proxy processing on a read request corresponding to FIG. 15. It is a feature of this invention that the proxy channel control unit performs processing up to a step set in the proxy level table 113 of the proxy channel control unit which has received the read request, and the processing of subsequent steps is performed by the requested destination channel control unit (continuation processing).

When the channel control unit confirms that the proxy processing information 124 is targeted at this channel control unit, this proxy processing information is analyzed (step 1). By analyzing the proxy processing information and extracting a processing step 1245, the proxy level can be identified. If the proxy level is 1, a cache hit/miss determination is performed on the cache of the access destination DKC (step 2). If the proxy level is 2 or higher, a cache hit/miss can be identified from the processing step 1245. When there is a cache miss or the proxy level is 2 and there is a cache miss in the step 2, a request is issued to the corresponding disk control unit to transfer this data to the cache (step 3). When the proxy level is 3 and there is a cache miss, or when the step 3 has terminated, read processing is interrupted until transfer is complete (step 4), and after staging is complete, read processing is resumed. When there is a cache hit or step 4 has terminated, data is looked up for the corresponding DKC channel control unit and transferred to the channel (step 5).

FIG. 17 is a flowchart showing an example of the processing when a write request is received. It is a feature of this example that the request receiving channel control unit performs processing up to the step set in the proxy level table 113, and the processing of the remaining steps is performed by the requested destination channel control unit.

When a write request is received, the original requested destination channel control unit, command and access address are analyzed from the request received, and it is verified that this is a write access (Step 1). The access address can be identified from the disk control unit number and drive number of the access request by looking up the system information 123 in the shared memory unit 12. Next, the proxy level table 113 is looked up to acquire the proxy level for the corresponding channel control unit. When the corresponding proxy level is 1, processing is continued by supplying the proxy processing information 124 to the requested destination channel control unit, and the request receiving channel control unit terminates the routine (step 11). In this example, the proxy processing information 124 is displayed via the shared memory unit 12, but the proxy processing information 124 can also be directly displayed to the corresponding channel control unit by a message or the like. When the proxy level is 2 or higher, a cache hit/miss determination is performed on the corresponding DKC cache identified in the step 1 (step 2). When there is a cache miss so that data is not held in the cache, a request is made to the corresponding drive control unit to transfer this data from the drive to the cache (step 3). Here, when the proxy level is 2, processing is continued by displaying the proxy processing information 124 to the requested destination channel control unit, and the request receiving channel control unit terminates the routine (step 13). When the proxy level is 3 or higher, write processing is interrupted until transfer is complete (step 6), and after staging is complete, write processing is resumed. Here, when the proxy level is 3, processing is continued by displaying the proxy processing information 124 to the requested destination channel control unit, and the request receiving channel control unit terminates the routine (step 14). When a hit is determined in the step 3, and the proxy level is 2 or 3, processing is continued by displaying the proxy processing information 124 to the requested destination channel control unit, and the request receiving channel control unit terminates the routine (step 15). Subsequently, or when staging is complete in the step 4, the data in the corresponding DKC cache is updated (step 5). When the proxy level is 4, processing is continued by displaying the proxy processing information 124 to the requested destination channel control unit, and the request receiving channel control unit terminates the routine (step 16). After updating is complete, a write process completion report is issued to the host computer (step 6). In the step 6, even if the channel control unit which performed processing is different from the access request destination of the host computer, a completion report is issued as if the original destination channel control unit replied.

FIG. 18 is a flowchart showing an example of continuation of proxy processing on a write request corresponding to FIG. 17. It is a feature of this invention that the proxy channel control unit performs processing up to a step set in the proxy level table 113 of the proxy channel control unit which received the write request, and the processing of the subsequent steps is performed by the requested destination channel control unit (continuation processing).

When the channel control unit verifies the existence of the proxy processing information 124 which targets the channel control unit, the proxy processing information is analyzed (step 1). By analyzing the proxy processing information and extracting the processing step 1245, the proxy level can be identified. If the proxy level is 1, a cache hit/miss determination is performed on the cache of the access destination DKC (step 2). If the proxy level is 2 or higher, a cache hit/miss can be identified from the processing step 1245. When there is a cache miss or the proxy level is 2 and there is a cache miss in the step 2, a request is made to the corresponding disk control unit to transfer the data to the cache (step 3). When the proxy level is 3 and there is a cache miss or after the step 3 has terminated, write processing is interrupted until transfer is complete (step 4), and after staging is complete, write processing is resumed. When the proxy level is 3 and there is a cache hit or the step 4 has terminated, the data is updated to the cache of the corresponding DKC (step 5). After the step 5 has completed or when the proxy level is 4, a write completion report is issued to the host (step 6).

FIG. 19 is a flowchart showing an example of the processing of the SVP40 when a certain channel control unit 11 develops a fault, and the channel control unit performs fail-over. The case will be described when the elements of the distribution table 31 updated by the SVP are two values indicating whether or not controllers are destination candidates, when the channel control units hold the proxy level table 113 and are updated by the SVP. Here, a channel control unit which is faulty will be referred to as a faulty channel control unit. The fault monitoring unit 4001 of the SVP40 checks whether there is a faulty channel control unit (step 1). Next, the load factors of normal channel control units obtained by the load monitoring unit 400 are looked up from the fault information table 401, and the channel control unit with the lowest load factor is found (step 2). Subsequently, the distribution table 31 is looked up, and rows where the requested destination channel control unit is the faulty channel control unit are progressively checked (step 3). If the corresponding element is 1, i.e., when the switch 30 was transferring requests to a faulty channel control unit, the corresponding element is set to 0 so that requests are not transferred to the faulty channel control unit. Further, the element for the requested destination channel control unit having the lowest load factor in this column of elements is set to 1 to prevent the situation where there is no requested destination channel control unit (step 4). The element corresponding to a faulty channel control unit in the proxy level table 113 with which the channel control unit having the lowest load factor is provided, is known as full proxy (step 5). Step 3, step 4, and step 5 are continued until a check has been completed on all rows.

FIG. 21 is a flowchart showing an example of the processing performed by the SVP40 when there is an imbalance in the load of the channel control units 11. First, it is checked whether there is an imbalance in the load factors of the channel control units from the load information table 401 obtained by the load monitoring unit 4002 of the SVP40 (step 1). An imbalance of the load factor is defined as the situation for example when the difference between the maximum load factor and minimum load factor exceeds a threshold value. Next, the channel control units are sorted in order of load factor (step 2). From this result, the distribution table 31 is updated to reduce the load factor of the channel control unit with the maximum load factor. The columns of the distribution table where the requested destination channel control unit is the channel control unit with the maximum load factor are checked in the sort order of step 2 (step 3). If the corresponding element is 0, the proxy level of the channel control unit with the maximum load factor in the proxy level table 113 with which the requested destination channel control unit is provided, is set to the initial value for proxy (step 4), and this element is set to 1 to register the channel control unit as a load balancing destination (step 5). If the corresponding element is 1, the next element is checked. After all elements have been checked or the step 5 has been completed, the rows of the distribution table where the requested destination channel control unit is the channel control unit with maximum load factor are checked in the sort order of step 2 (step 6). When the corresponding element is 1, this element is set to 0 to delete the channel control unit with the maximum load factor from the load balancing destinations targets (step 7), and the proxy level of the target channel control unit in the proxy level table of the channel control unit with the maximum load factor is set to no proxy (step 8). When the corresponding element is 0, the next element is checked. When all elements have been checked or the step 8 has been completed, the routine is terminated.

FIG. 22 is a flowchart showing an example of the processing of the SVP40 when it performs fail-over on one of the channel control units 11 which has developed a fault. The case will be described where the elements of the distribution table updated by the SVP show probabilities that channel control units will be destinations, and the channel control units hold the proxy level table 113 which is updated by the SVP. Here, a channel control unit which has developed a fault will be referred to as a faulty channel control unit. The fault monitoring unit 4001 of the SVP40 checks whether there is a faulty channel control unit (step 1). Next, the load factors of the normal channel control units obtained by the load monitoring unit 4002 are looked up from the fault information table 401, and the channel control unit with the minimum load factor is found (step 2). Subsequently, the distribution table 31 is looked up, and the rows where the requested destination channel control unit is the faulty channel control unit are progressively checked (step 3). When the corresponding element is greater than 0, i.e., when the switch 30 was transferring requests to the faulty channel control unit, this element is set to 0 so that requests are not transferred to the faulty channel control unit, and the original element of the faulty channel control unit is added to the element for the channel control unit with the minimum load factor (step 4). Also, the element corresponding to the faulty channel control unit in the proxy level table 113 with which the channel control unit having the minimum load factor is provided, is set to full proxy (step 5). Step 3, step 4, and step 5 are continued on all rows until the check is complete.

FIG. 23 is a flowchart showing an example of the processing of the SVP40 when an imbalance occurs in the load of the channel control units 11. The case will be described where the elements of the distribution table 31 updated by the SVP show probabilities that channel control units will be destinations, and the channel control units hold the proxy level table 113 which is updated by the SVP. First, it is checked whether there is an imbalance in the load factors of the channel control units from the load information table 401 obtained by the load monitoring unit 4002 of the SVP40 (step 1). Next, the normal channel control units with the minimum and maximum load factors are selected (step 2). Δ is subtracted from all elements >Δ in the rows of the distribution table 31 for which the channel control unit with the maximum load factor is the forwarding port (step 3). In this case, elements corresponding to the channel control unit which developed a fault are excluded. Here, matches are taken for the proxy level table 113. The proxy level of the destination channel control unit in the proxy level table of the channel control unit with the highest load factor corresponding to the element which became 0 in step 3, is set to no proxy (step 4). Next, Δ is added to elements corresponding to the forwarding port subtracted in the step 3 for rows of the distribution table 31 where the channel control unit with the minimum load factor is the forwarding port (step 5). Here also, matches are found? for the proxy level table 113. For the proxy level table in the destination channel control unit corresponding to the element increased from 0 in the step 5, the proxy level of the channel control unit with the highest load factor is set to the initial value for proxy (step 6).

FIG. 24 is a flowchart showing an example of the processing performed when the SVP40 updates the proxy level table 113 of the channel control units when an imbalance occurs in the load of the channel control units 11. First, it is checked whether there is an imbalance in the load factors of the channel control units from the load information table 401 obtained by the load monitoring unit 4002 of the SVP40 (step 1). Next, the normal channel control units with the minimum and maximum load factors are selected (step 2). Here, the distribution table 31 is looked up, and it is checked whether the entries are such that the channel control unit with the minimum load factor is acting as a proxy for the channel control unit with the maximum load factor (step 3). If there is no such entry, the distribution table 31 is updated and the routine is terminated by the preceding example (step 6). If there is already an entry, the proxy level table 113 of the channel control unit with the minimum load factor is looked up, and the proxy level for the present channel control unit with the maximum load factor is examined (step 4). If this is already the maximum level, the routine is terminated. If it has not yet reached the maximum level, the proxy level of the channel control unit with the minimum load factor relative to the channel control unit with the maximum load factor, is increased by 1 (step 5).

In the above, the control performed by the channel control units 11 and SVP40 was described. Next, the access request destination control of the switch 30 when the elements of the distribution table are destination probabilities will be described referring to FIG. 25.

Figure 25:
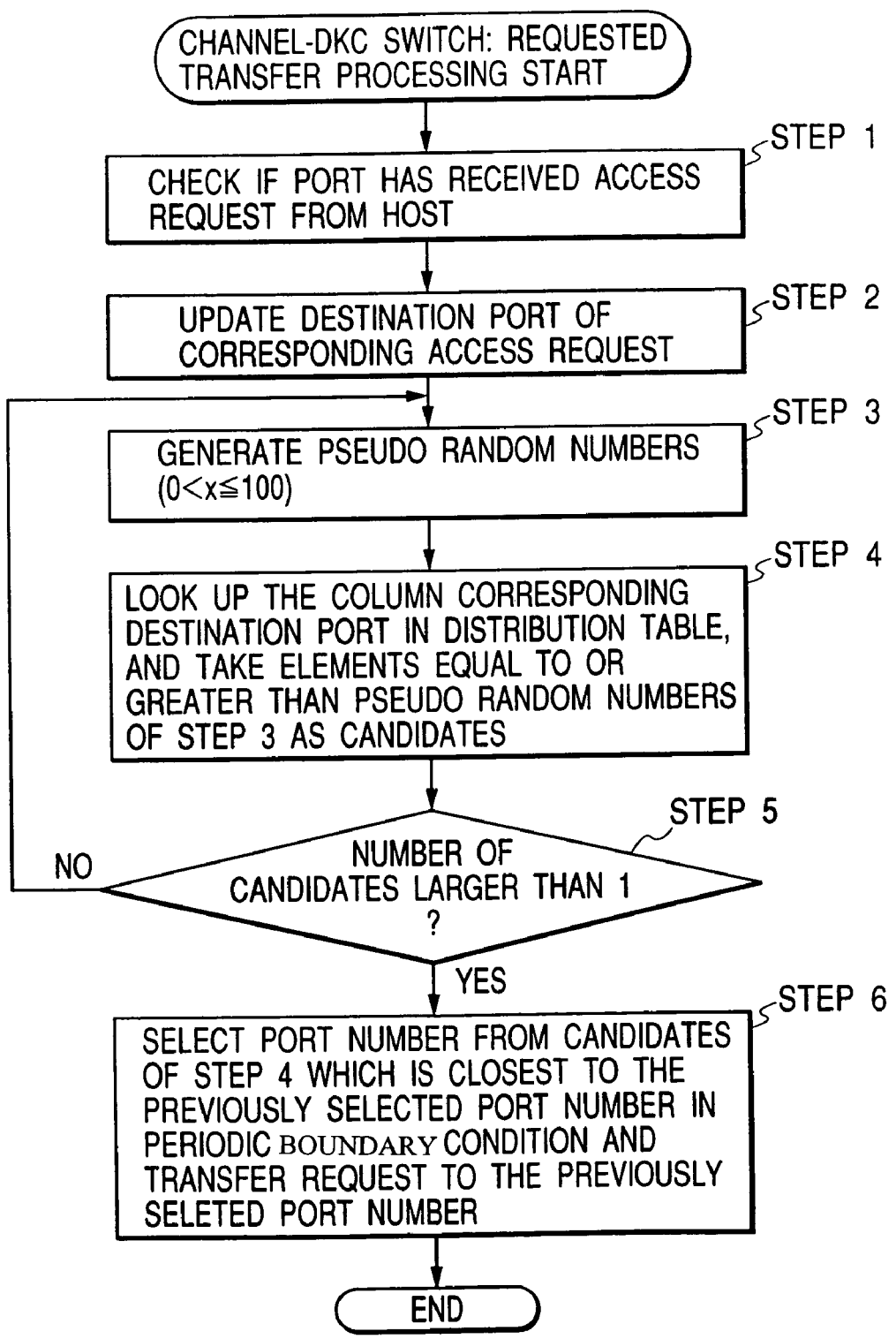
FIG. 25 is a flowchart showing an example of processing which determines an access request forwarding port of the channel-DKC switch of the disk control unit according to this invention.

FIG. 25 is a flowchart showing the method of selecting a DKC port 3021 when the host port 3011 has received an access request in the switch 30 when the elements of the distribution table 31 show destination probabilities. First, the host port checks that the access request from the host computer 0 has reached the host port 3011 (step 1). Next, the forwarding port for this access request is analyzed (step 2). Also, a pseudo random number is generated (step 3). To generate the pseudo random number, a fixed processing is performed on a counter value which is constantly counted or a random number which is updated on each occasion, and the lower digit of this result is used. Next, the column of the corresponding forwarding port in the distribution table 31 is looked up, and elements which are equal to or greater than the pseudo random number obtained in the step 3 are taken as destination candidates (step 4). If the number of candidates is 0, the routine returns to the step 3 (step 5). If there is a candidate, the candidate which is nearest in the positive direction according to a periodic limiting condition is selected from an index of candidates selected on the immediately preceding occasion, as the forwarding port number, and the corresponding request is transferred to the selected DKC port (step 6).

Next, an example of the window which appears when the system administrator performs a load balancing setting of the system via the SVP40, will be described referring to FIG. 26.

Figure 26:
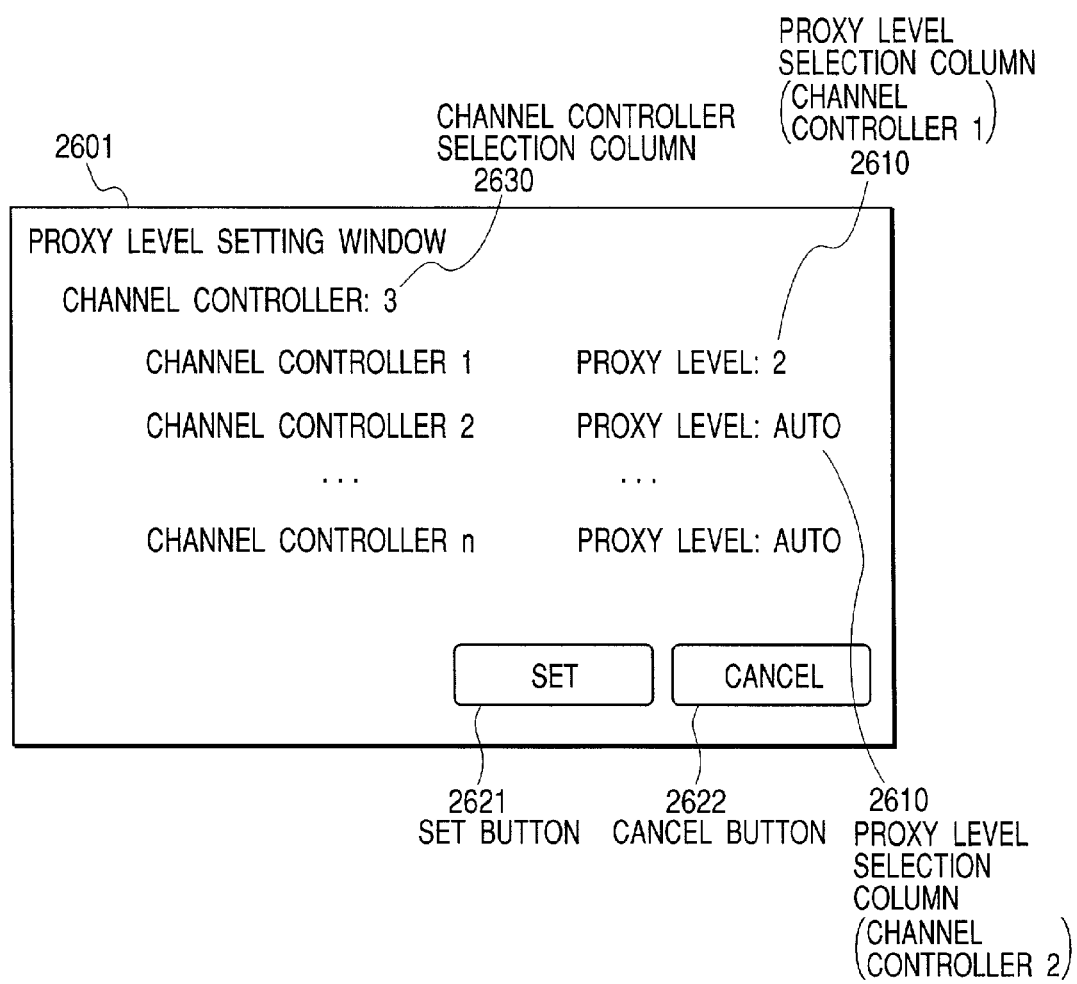
FIG. 26 is a block diagram showing an example of a window displayed by the SVP when the proxy level of the disk control unit according to this invention is set.

FIG. 26 is an example of the setting window when the system administrator performs a setting, where the SVP40 performs load balancing by specifying a command to a channel control unit using a terminal, not shown, via a system administrator interface 404 of the SVP40. A proxy level setting window 2601 has a set channel control unit selection column 2630 where the channel control unit to be set is selected, and a proxy level selection column 2610 corresponding to the channel control units. The system administrator selects the channel control unit to be set in the set channel control unit selection column 2630 or proxy level selection column 2610 by selection input from a keyboard or GUI. The proxy level of each channel control unit can be set. In this case, if a set button 2621 is selected by the aforesaid input method, the details said in this window are reflected in the proxy level table 113 and distribution table 31 via the SVP40. For channel control units selected automatically by the proxy level selection column 2610, the SVP40 performs updating of the proxy level. The information set here is stored by a local memory of the SVP40, and held until the next occasion when it is reset in this window. Also, if a cancel button 2622 is selected by the aforesaid input method, the setting information before calling this window continues to be used.

By providing the channel-DKC switch, access requests can be divided among plural channel control units. Thus, even if the host computer is not made aware of the internal structure of the system, load balancing according to the load of the channel control units can be performed. Likewise, a channel control unit which is faulty can be avoided, and an access request can be processed by another channel control unit. In this case also, manipulation can be continued without the host computer being aware that a channel control unit has developed a fault, or being aware of the internal construction of the system.

Further, if load balancing is performed by the proxy processing of this invention, if target data exists in the channel control unit DKC which continued processing of a read access request according to the set proxy level, a reply can be made to the host computer without the read data passing through the messaging means of the disk control units. In this way, load balancing of the messaging means between the disk control units is also achieved. In particular, if load balancing is performed in an environment where sequential read requests are frequent, with full proxy, the read data occupies the messaging means between the disk control units and the messaging means of the disk control units becomes trapped in a bottleneck. However, by using proxy processing, load balancing of the channel control units can be achieved without any special type of access in the system usage environment.

What is claimed is:

1. A clustering disk controller, comprising:
   a plurality of disk controllers,
   clustering disk connection means among said plurality of disk controllers which connects said plurality of disk controllers,
   channel control units installed in said disk controllers,
   a switch installed in said clustering disk controller and connected to said channel control units and a host computer;
   wherein said switch comprises a data table for holding correspondence information between a destination channel control unit which is an access destination set by said host computer and a channel control unit which actually transfers the access request, and
   wherein plural channel control units can be specified as the destination of the access request from said host computer, and said data table stores a probability that an individual channel control unit of said plural channel control units will be selected as a channel controller which actually forwards said access request.

2. A clustering disk controller, comprising:
   a plurality of disk controllers,
   clustering disk connection means among said plurality of disk controllers which connects said plurality of disk controllers,
   channel control units installed in said disk controllers,
   a switch installed in said clustering disk controller and connected to said channel control units and a host computer;
   wherein said switch comprises a data table for holding information on whether or not to transfer data to a different channel control unit from the channel control unit which received the access request from said host computer, and
   wherein plural channel control units can be specified as the destination of the access request from said host computer, and said data table stores a probability that an individual channel control unit of said plural channel control units will be selected as a channel controller which actually forwards said access request.

3. The clustering disk controller as defined in claim 1, further comprising a service processor (SVP) which manages the information in the clustering disk controller and modifies said data table.

4. The clustering disk controller as defined in claim 1, further comprising proxy level tables holding information on an intermediate step until the channel control unit which received the access request from the host computer should process the access request.

5. A control method of a disk subsystem which comprises
   a plurality of disk controllers,
   clustering disk connection means among said plurality of disk controllers which connects said plurality of said disk controllers,
   channel control units, and
   a switch equipped with a data table for transferring an access request from a host computer to the channel control units, the method comprising:
   a step of transferring an access request from the host computer to a predetermined channel control unit based on said data table,
   a step of processing the access request, by the channel control units to which said access request is transferred,
   a step of sending, to the host computer, data indicating that the destination channel control unit specified as the destination of the access request from the host computer has replied to the access request, and
   a step of storing in said data table a probability that an individual channel control unit of said plural channel control units will be selected as a channel controller which actually forwards said access request.

6. The disk subsystem control method as defined in claim 5, comprising:
   a step wherein if the channel control unit to which the access request is transferred is different from the destination of the access request from the host computer, the channel control units which received the request processes the request up to an intermediate step,
   a step wherein completion of processing up to the intermediate step is notified to the requested destination channel control unit, and
   a step wherein the remaining processing is performed by said requested destination channel control unit.

7. The disk subsystem control method as defined in claim 5, wherein said disk subsystem comprises:
   a proxy level table holding information on an intermediate step up to which a channel control unit which received the access request from the host computer should process said access request; the method comprising:

a step wherein said channel control unit processes the access request transferred by said switch up to the intermediate step based on the information recorded in said proxy level table;

a step wherein completion of processing up to said intermediate step is notified to the channel control unit which is the requested destination of the access request actually specified by the host computer; and a step wherein the remainder of the access request processing which has been performed up to the intermediate step, is performed by the requested destination channel control unit.

8. The disk subsystem control method as defined in claim 5, wherein the disk subsystem comprises a service processor (SVP) which manages information in the disk controllers, said SVP looks up load information for the channel control units, and modifies said data table so that an access request from the host computer addressed to a channel control unit under heavy load, is transferred to a channel control unit under low load, and the channel control units each report their own load status and the SVP receives the status reports from the channel control units.

9. The disk subsystem control method as defined in claim 8, wherein said SVP looks up fault information for the channel control units, and modifies said data table so that an access request from the computer addressed to a faulty channel control unit, is transferred to a normal channel control unit, and the SVP obtains fault information based on receiving or not receiving a status report from a channel control unit.

10. The disk subsystem control method as defined in claim 8, wherein said SVP looks up load information for the channel control units, and modifies said data table so that the processing level with respect to the channel control unit under low load is increased, and the SVP issues a command to increase the processing level.

* * * * *